United States Patent [19]

Massara et al.

[11] Patent Number: 5,462,225
[45] Date of Patent: Oct. 31, 1995

[54] APPARATUS AND METHOD FOR CONTROLLING DISTRIBUTION OF ELECTRICAL ENERGY TO A SPACE CONDITIONING LOAD

[75] Inventors: James M. Massara, Dunwoody; Glenn A. Davis, Lilburn, both of Ga.

[73] Assignee: Scientific-Atlanta, Inc., Atlanta, Ga.

[21] Appl. No.: 192,163

[22] Filed: Feb. 4, 1994

[51] Int. Cl.$^6$ ............................. H02J 1/00; G05D 23/00
[52] U.S. Cl. .............................. 236/47; 236/51; 307/39
[58] Field of Search ...................... 236/46 R, 47, 236/51; 307/39

[56] References Cited

U.S. PATENT DOCUMENTS

| | | | |
|---|---|---|---|
| 3,979,060 | 9/1976 | Tierce | 236/46 R |
| 4,020,358 | 4/1977 | Wyland | 307/39 |
| 4,100,428 | 7/1978 | Delisle et al. | 307/97 |
| 4,190,800 | 2/1980 | Kelly, Jr. et al. | 340/310 A |
| 4,247,786 | 1/1981 | Hedges | 307/35 |
| 4,318,508 | 3/1982 | Glasgow et al. | 236/47 |
| 4,336,902 | 6/1982 | Neal | 236/51 X |
| 4,341,345 | 7/1982 | Hammer et al. | 236/46 R |
| 4,345,162 | 8/1982 | Hammer et al. | 307/39 |
| 4,353,502 | 10/1982 | Myers | 236/47 |
| 4,389,577 | 6/1983 | Anderson et al. | 307/39 |
| 4,780,910 | 10/1988 | Huddleston et al. | 455/617 |
| 4,819,180 | 4/1989 | Hedman et al. | 307/39 X |
| 5,104,037 | 4/1992 | Karg et al. | 236/51 X |
| 5,318,224 | 6/1994 | Darby et al. | 236/51 X |

FOREIGN PATENT DOCUMENTS 0019538  2/1982  Japan ........................ 307/39

OTHER PUBLICATIONS

D. E. Nordell, "Duty Cycling Choices for Load Management," Oct. 9, 1989.
D. E. Nordell, "Forced Duty Cycling of Air Conditioning Units for Load Management," published in 1987 by the IEEE Power Engineering Society.

Primary Examiner—William E. Wayner
Attorney, Agent, or Firm—Jones & Askew

[57] ABSTRACT

An apparatus and method for controlling energy supplied to a space conditioning load and for overriding a load control operation in response to measuring certain space temperatures within a closed environment. The load control apparatus includes a control device connected to an electrical distribution network and to a space conditioning load and a temperature sensing device connected to the control device. The control device conducts a load shedding operation to control distribution of electrical energy to the space conditioning load in response to command signals supplied by a remote command center. The temperature sensing device operates to override the load shedding operation by outputting a control override signal to the control device in response to sensing certain space temperatures within the closed environment. If the temperature control device is connected to an air conditioning system, the temperature sensing device causes the control device to terminate the load shedding operation prior to expiration of a selected time period in response to measuring a space temperature that exceeds a maximum space temperature limit. In contrast, if the temperature control device is connected to a forced air heating system, the temperature sensing device causes the control device to terminate the load shedding operation when a measured space temperature drops below a minimum space temperature limit. The maximum space temperature limit is greater than the control temperature setpoint of a thermostat that controls the space conditioning operations, whereas the minimum space temperature limit is less than the control temperature setpoint.

49 Claims, 4 Drawing Sheets

APPARATUS AND METHOD FOR CONTROLLING DISTRIBUTION OF ELECTRICAL ENERGY TO A SPACE CONDITIONING LOAD

TECHNICAL FIELD

The present invention relates generally to electrical utility load management systems, and more particularly relates to an electrical load management device for controlling distribution of electrical energy to a space conditioning load in response to a utility command and overriding utility control of the space conditioning load upon measuring a certain space temperature within a closed environment.

BACKGROUND OF THE INVENTION

Electrical utilities face the problem of satisfying consumer demand for electrical energy during peak and off-peak demand periods. Total electrical energy demand varies significantly between the peak and off-peak demand periods. For example, energy demand typically peaks on a hot summer afternoon as a result of the widespread simultaneous operation of air conditioning systems, and energy demand subsequently drops during the off-peak period of the late evening. To accommodate very high peak demands, utilities face the options of investing in additional power generating capacity, buying power from other utilities having excess capacity, or using an electrical load management system to control the amount of electrical energy distributed over the electrical distribution network during peak energy demand periods by electrical load reductions, commonly referred to as lead shedding.

Electrical load management systems for allowing an electrical utility to control the load on the electrical distribution network are known in the art. These systems operate to divert energy requirements to minimize electrical blackouts or "brown-outs." U.S. Pat. No. 4,190,800 to Kelly, Jr. et at., entitled "Electrical Load Management System," assigned to the same assignee as the present invention, describes an electrical load management system wherein a utility command center monitors the use of electrical power and, when peak demand periods occur, transmits coded information by radio from the command center to remote receivers mounted at distribution transformers located proximate to the electrical loads. In this patent, the transmitted signal includes address and command data that are decoded at the receivers. Receivers addressed by the command center pass command information over the distribution lines to the electrical loads, and thereby control the operation of the customers' power consuming devices.

Other load management systems utilize separate radio receivers at each customer's location, rather than providing a receiver at the distribution transformer as in the aforementioned patent. Examples of this type system include the types DCU-1120, -1170, -1180, -1190, and -S2000A utility radio switches, otherwise described as digital control units or load control switches, manufactured by Scientific-Atlanta, Inc., Atlanta, Ga., and the type REMS-100 radio switch previously manufactured by General Electric, King of Prussia, Pa. These utility radio switches incorporate an FM receiver that can receive a transmitted signal up to about 25 miles from a transmitter site located at a command center. The transmitter issues commands to temporarily remove power from a selected load. This self-contained receiver is typically mounted on or immediately adjacent to the electrical loads under control, and receives its power from the line that feeds the controlled loads. Switches, jumpers, or other means contained within the receiver configure the receiver to respond only to a particular address or set of addresses, so that different geographical areas, types of appliances, or numbers of consumers may be separately controlled.

Although a utility benefits by implementing load reductions during peak demand periods, such energy management devices typically do not address the impact of interrupted or reduced energy service upon the consumer. A consumer may find the temporary interruption of energy to its air conditioning or forced heating systems to be undesirable if such service interruptions cause abrupt changes in the environmental temperature, such as overheating or underheating. Utilities recognize that consumers' discomfort resulting from energy management control could lead to those consumers seeking the removal of energy management devices from their premises. Because a utility commonly offers an incentive to a consumer in exchange for permission to install an energy control device, the consumer's decision to remove the installed device eliminates the utility's opportunity to control the consumer's energy consumption and wastes the utility's resources.

Prior art energy control systems have addressed the issue of maintaining consumer comfort during energy reduction operations. U.S. Pat. No. 4,819,180 to Hedman et al. describes an energy demand control system for measuring total power consumption of each user and thereafter modifying the user's total power consumption in response to a utility control signal from a remote location. The average total power consumption is modified by an amount correlated with the user's energy usage pattern. If the utility control signal defines a particular percentage for reduction of power consumption by each user, the actual percentage reduction implemented by the demand consumption system is a percentage of the average total power consumption of each user. The demand control system controls the maximum usage of energy for a group of controllable loads located at a consumer's premise. Accordingly, the actual percentage reduction implemented by the system is based upon the total usage of energy by all of the loads at that location and not a specific single load, such as an air conditioner.

The power reduction for a particular user can be interrupted by the Hedman et al. demand control system in the event that the temperature at the user's locale is below a predetermined level. A temperature sensor monitors the temperature in the consumer's building and enables a logic circuit to override the utility control operation should the temperature rise above or fall below predetermined limits. If the logic circuit operates to override utility control operation, the system subsequently releases control of all such loads at the consumer's premises. This interruption of the utility's control operation affects all loads at the consumer's site, including those loads that do not operate to condition the space temperature within the consumer's closed environment.

Although the Hedman et al. demand control system may be effective in reducing the peak energy consumption of individual users in response to a utility's command, the system also suffers from the disadvantage of restoring energy when a certain temperature within the closed environment is measured to both a space conditioning load and a group of loads that do not condition the space temperature of the closed environment. In addition, if a large number of demand control systems are controlled simultaneously by the utility, a significant immediate change in peak energy demand may occur which causes an undesirable spike in the utility energy distribution network.

Another prior art energy management system is described in U.S. Pat. No. 4,341,345 to Hammer et al. This patent describes the control of power consumption of individual space conditioning loads by a programmable temperature control device, such as a thermostat. A radio receiver receives a command signal from the utility company and, in response, the setpoint function of the thermostat is remotely controlled by the utility. Consumer control is removed in response to the utility's command signal. In the cooling mode, the control temperature setpoint is raised to a maximum predetermined temperature limit during peak power consumption periods to reduce energy consumption. Thereafter, the control temperature setpoint is returned to the original temperature set by the consumer and consumer control is restored. Physical discomfort for the consumer is minimized by gradually ramping the control temperature setpoint to the maximum temperature limit during the peak power period.

Although the Hammer et al. system allows the utility to remotely control the temperature setpoint without the consumer's knowledge of setpoint modification, this operation affects space conditioning operations without regard to the consumer's personal comfort level. As a result, some consumers will be more severely impacted by an energy control operation implemented by the Hammer et al. system than others.

To promote energy conservation and to achieve environmental objectives, there is a need for an improved load control device that permits consumers to conserve energy on a continuous basis while affording utilities the opportunity to control peak energy demand. It would be highly advantageous to implement a load management system for controlling the electrical energy supplied to an individual space conditioning load by combining the environmental control and temperature sensing functions offered by a conventional programmable thermostat with the known load control switching function supplied by a load control switch. The system controls distribution of electrical energy to a space conditioning load in response to a utility command and overrides utility control of the space conditioning load upon measuring certain space temperatures within a closed environment. This system also achieves required load reductions from a controllable space conditioning load with a minimum impact on the comfort levels for the occupant of the conditioned location. The utility controls a space conditioning load at each consumer's location to implement a peak energy demand management program.

The present invention provides a novel combination of thermostat and load control switching functions to minimize the costs associated with the manufacture, installation, and maintenance of the discrete components supplying those separate functions. By the use of programmable temperature setpoints for an electronic programmable thermostat, the consumer can conserve valuable natural energy resources while the utility achieves the desired flexibility of peak demand energy control by equitable control operations performed by the load control switch. In addition, a utility can offer the consumer the use of the electronic programmable thermostat as an incentive to join the peak energy demand management program. Simple and economical installation of the system is achieved by combining the desired functions within the same enclosure and powering the system with the same low voltage power source.

SUMMARY OF THE INVENTION

The present invention overcomes the limitations of the prior art by providing an apparatus and method for controlling energy supplied to an electrical load and for overriding a load control operation in response to measuring certain space temperatures within a closed environment.

Briefly described, the load control apparatus includes a control device connected to a space conditioning load and to an electrical distribution network. The control device, also described as a controller, controls distribution of electrical energy to the load in response to command signals transmitted by a utility from a command center remotely located from the load control apparatus. Distribution of electrical energy to the load is temporarily interrupted by the control device in response to a command signal to disconnect the load from the network. A utility typically implements such a load shedding operation for a selected time period to reduce energy consumption during a peak energy period. The selected time period can be either a predetermined fixed time period or a variable time period based upon the historical operating duty cycle of the space conditioning load. By transmitting command signals, the utility can control selected operations of the load control apparatus and supply certain operating parameter to the apparatus.

The load control apparatus further includes a temperature sensing device for measuring space temperatures within a closed environment, such as a consumer's residence or business. The temperature sensing device, which may include a thermistor, outputs temperature signals representing sensed space temperatures to the control device. Each of the temperature signals has a value corresponding to one of the sensed space temperatures. In response to certain temperature signals sensed by the temperature sensing device, the control device overrides any load shedding operation in process, thereby restoring the distribution of electrical energy to the space conditioning load. Specifically, the control device overrides the load shedding operation in response to a temperature signal representing a value of a sensed space temperature that exceeds a maximum space temperature limit. The control device also overrides the load shedding operation in response to another temperature signal representing a value of another space temperature that drops below a minimum space temperature limit.

The minimum and maximum space temperature limits are typically selected by a utility to ensure that a consumer remains comfortable within its home or business. The maximum space temperature limit typically exceeds a space temperature that is normally associated with consumer comfort. The minimum space temperature limit is typically lower than a space temperature that is normally associated with consumer comfort. For example, if the space conditioning load is an air conditioning system, the maximum space temperature limit normally exceeds the typical control temperature setpoint for a thermostat that controls the cooling operations. In contrast, if the space conditioning load is a heating system, such as a forced air furnace, the minimum space temperature limit is normally below the typical control temperature setpoint for a thermostat that controls the heating operations. Accordingly, the process of overriding the utility's load control operation when a sensed space temperature either exceeds the maximum space temperature limit or drops below the minimum space temperature limit restores the distribution of electrical power to the load and enables the desired cooling or heating space conditioning operation. This prevents an extreme temperature shift within the closed environment because the load shedding operation is interrupted, thereby allowing the load to conduct a space conditioning operation prior to expiration of the selected time period.

For another aspect of the present invention, the temperature sensing device outputs a control override signal to the control device in response to sensing a space temperature that exceeds a maximum space temperature limit or another space temperature that drops below a minimum space temperature limit. In response to the control override signal, the control device restores distribution of electrical energy by inserting the load into the electrical distribution network prior to expiration of the selected time period. In turn, the thermostat regains control over the space conditioning operations of the space conditioning load and initiates a space conditioning operation because the maximum space temperature limit exceeds the control temperature setpoint for cooling operations and the minimum space temperature limit is below the control temperature setpoint for heating operations.

Still more particularly described, the load control apparatus includes a load operation control device connected to the space conditioning load and to the control device. The control device implements a load shedding operation to control distribution of electrical energy to the space conditioning load in response to command signals supplied by the remote command center. It normally removes the load from the network for a selected time period in response to the utility's command. The load operation control device senses space temperatures within the closed environment and controls the space conditioning operations of the load in response to a control temperature setpoint.

If the load operation control device measures a space temperature that exceeds a maximum space temperature limit, it outputs an override signal that causes the control device to override any load shedding operation. The load operation control device also outputs the override signal when a measured space temperature drops below a minimum space temperature limit. Although the control device temporarily interrupts the load operation control device's control of the load in response to the utility's command, the load operation control device regains control over space conditioning operations when it measures those space temperatures and outputs the override signal, thereby causing the control device to override the load control operation. The restoration of electrical energy upon either (1) expiration of the selected time period, which is the scheduled conclusion of the load shedding operation, or (2) interruption of the load shedding operation, permits the load operation control device to once again control space conditioning operations.

The control device includes a receiver connected to a switch. The receiver receives command signals via a receiving antenna and outputs decoded command signals to the switch. In response to a selected decoded command signal for initiating a load control operation, the switch interrupts distribution of electrical energy to the space conditioning load by removing the load from the network for a selected time period. The switch restores distribution of energy to the load by inserting the load within the network in response to either expiration of the selected time period or reception of the override signal from the temperature control device.

The load operation control device, also described as a thermostat, includes a temperature switch and a temperature controller connected to the temperature switch and to the control device. The temperature switch connects the space conditioning load to the control device during a first operating state and disconnects the space conditioning load from the control device during a second operating state. The space conditioning load is energized and can conduct space conditioning operations during the first operating state. However, it cannot conduct such operations during the second operating state because the temperature switch interrupts the flow of energy to the load in that operating state.

The temperature controller controls the space conditioning operations of the space conditioning load by selecting either the first operating state or the second operating state in response to the control temperature setpoint. The consumer selects the control temperature setpoint of the temperature controller to control the temperature within the consumer's home or business. The control temperature setpoint for a space conditioning load operating in a cooling mode is normally different from the control temperature setpoint for a space conditioning load operating in the heating mode.

In the cooling mode, the temperature controller selects the first operating state in response to measuring any space temperatures that exceed the control temperature setpoint. In contrast, the temperature controller selects the second operating state in response to measuring space temperatures that drop below the control temperature setpoint. The temperature controller selects the operating states in reverse fashion when the space conditioning load operates in the heating mode. In particular, for the heating mode, the temperature controller selects the first operating state in response to measuring any space temperatures that drop below the control temperature setpoint and selects the second operating state in response to measuring space temperatures that exceed the control temperature setpoint.

The temperature controller also outputs the override signal to the control device in response to sensing a space temperature that exceeds the maximum space temperature limit (cooling mode) or drops below the minimum space temperature limit (heating mode), thereby causing the control device to override a load shedding operation. This interrupts the load shedding operation by the control device prior to expiration of the selected time period. For the cooling mode of the space conditioning load, the maximum space temperature limit typically exceeds the control temperature setpoint. Accordingly, the temperature controller selects the first operating state to enable cooling operations within the closed environment after interruption of the load shedding operation. In contrast, the minimum space temperature limit is typically less than the control temperature setpoint when the space conditioning load operates in the heating mode. Thus, the temperature controls selects the first operating state to enable heating operations by the space conditioning load after interruption of the load shedding operation.

A memory storage device can be connected to the temperature controller (or to the control device) for storing the minimum and maximum space temperature limits. The utility typically programs the load operation control device with such limits prior to installation of the device within the consumer's environment.

Accordingly, it is an object of the present invention to provide an improved electrical load control device.

It is another object of the present invention to provide an electrical load control device for interrupting distribution of electrical energy to a space conditioning load from an electrical distribution network in response to a command signal, wherein distribution of electrical energy is restored prior to expiration of a selected time period in response to measuring a space temperature that exceeds a maximum space temperature limit or another space temperature that drops below a minimum space temperature limit.

It is another object of the present invention to provide a load control device operative as both a load control switch for controlling distribution of electrical energy to a space conditioning load and as a thermostat for controlling space conditioning operations of the space conditioning load.

It is another object of the present invention to provide a load control device including both a load control switch for controlling distribution of energy to a space conditioning load and a load operation control device for controlling space conditioning operations of the load, wherein the load operation control device overrides load control operations in response to measuring a space temperature that either exceeds a maximum temperature or drops below a minimum space temperature.

It is another object of the present invention to provide a method for preventing overheating or overcooling within a closed environment during a utility's load shedding operation.

It is another object of the present invention to provide a load control device that permits a consumer to conserve energy through one or more selected control temperature setpoints while also allowing a utility to remotely conduct peak load control operations.

It is another object of the present invention to provide a load control device that is powered by a low voltage drawn from the control subsystem of the space conditioning load, thereby permitting the device to be easily installed by the typical consumer.

It is another object of the present invention to combine the functions of a programmable thermostat with a conventional radio controllable switch to provide a load control device mounted within a single housing, thereby minimizing external wiring connections and reducing manufacturing and installation expenses.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
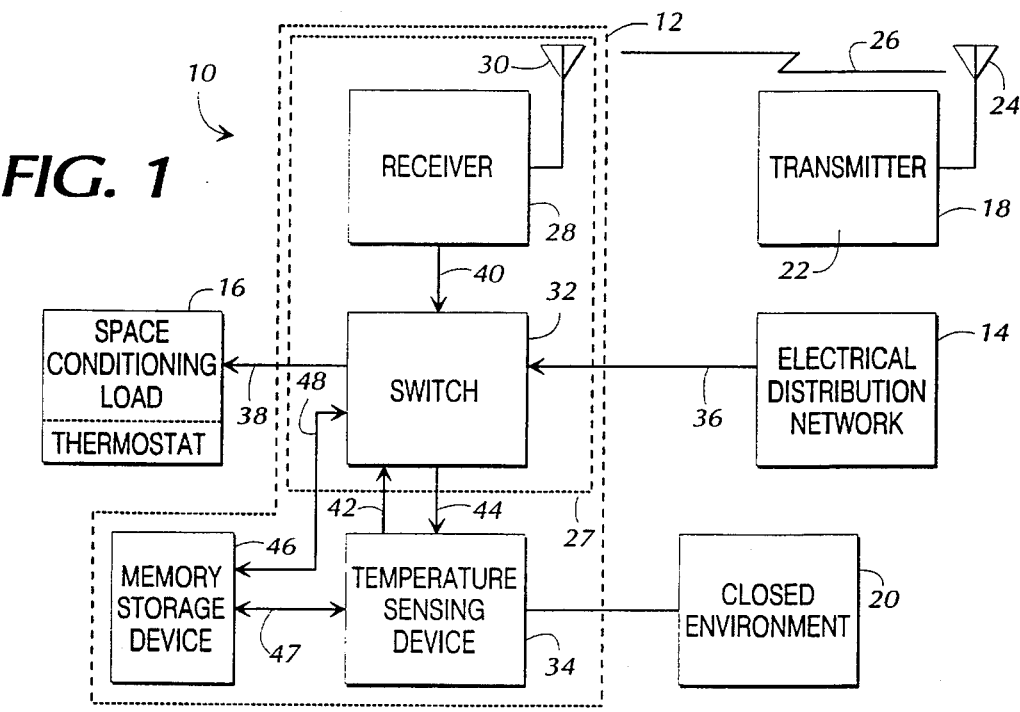
FIG. 1 is a block diagram of an embodiment of the present invention.

Referring now to the drawings, in which like numerals indicate like elements throughout the several figures, FIG. 1 illustrates an electrical load management system 10, including a load control device 12 connected between an electrical distribution network 14 and a space conditioning load 16, such as an air conditioning system and/or a forced air heating system. The load control device 12 operates to control distribution of electrical energy supplied by a utility via the electrical distribution network 14 to the space conditioning load 16. In response to a command issued from the utility, the load control device 12 interrupts distribution of electrical energy by removing the load 16 from the network 14. The load control device 12 normally operates to restore power to the load 16 upon expiration of a selected time period. This allows the utility to control the amount of electrical energy distributed by the network 14 during peak energy demand periods, which is a process commonly referred to as load shedding.

To prevent consumer discomfort during a period of temporarily interrupted or reduced energy service, the load control device 12 further operates to override the utility's load shed command in response to measuring certain space temperatures within a closed environment 20. For example, if the space conditioning load 16 is an air conditioner unit, the load control device 12 overrides the command to shed the load in response to measuring a space temperature within the consumer's business or residence that exceeds a maximum space temperature limit. Alternatively, if the space conditioning load 16 is a forced air heating system, the load control device 12 overrides a load control operation in response to measuring a space temperature that drops below a minimum space temperature limit. The override function of the load control device 12 prevents abrupt changes in the environmental temperature, such as overheating or underheating, as a result of the load shedding operation.

An electrical utility generally services many customers and, accordingly, the electrical distribution network 14 distributes energy to a set of loads, such as the space conditioning load 16, located within a defined geographical region. Each load is typically located proximate to a customer's residence or business. The utility will typically install the load control devices 12 either on or adjacent to each space conditioning load 16 to be controlled to permit the utility to individually control the power consumed by each customer. Thus, it will be understood that the electrical load management system 10 preferably includes a group of load control devices, as represented by the load control device 12, and a group of independently controllable loads, such as the space conditioning load 16.

The structure and operation of an exemplary electrical load management system comprising a utility transmitter and a plurality of load control devices for receiving coded information by radio from a command center to implement a load control operation is shown in U.S. Pat. No. 4,190,800 to Kelly, Jr. et al., assigned to the same assignee as the present invention, the disclosure of which is incorporated herein by reference and made a part hereof.

To communicate with the load control device 12, the utility sends command signals 26 from a command center 18 that is remotely located from the device 12. The command center 18 is preferably a wireless communications system, such as a radio frequency (RF) transmitter 22 connected to a transmitting antenna 24. Thus, the utility remotely controls the load shedding operations via a communications link between the respective locations of the command center 18 and the load control device 12. Those persons skilled in the art will appreciate that the communications function supplied by the command center 18 also can be implemented as a power line carrier system or as a wired or wireless telephone system.

By coding the commands carried by the command signal 26, otherwise described as coded command signals, the utility can communicate with a selected subset of available load control devices. In this manner, the utility can implement an electrical load management strategy for controlling energy supplied to particular types of loads or to loads either located in a specific geographical region of the electrical distribution network 14 or associated with certain types of utility customers, such as residential customers. Each coded command signal 26 includes addressing data and command data to enable the utility to manage and communicate with the selected subset of the load control devices 12. A load control device 12 responds to only those coded command signals 26 including addressing data associated with that particular device.

The load control device 12 includes a controller 27 and a temperature sensing device 34. The controller 27 comprises a receiver 28, connected to a receiving antenna 30, and a switch 32. The receiver 28, otherwise referred to as a receiving means, is implemented as a conventional, very high frequency (VHF) superheterodyne receiver. The coded command signal 26 is received via the receiving antenna 30 and supplied to an RF amplifier (not shown). The amplified signal is filtered and supplied to the input of a mixer (not shown). The mixer, which is also connected to a local oscillator (not shown), downconverts the received signal to a first intermediate frequency (IF). This first IF signal is further downconverted by a second downconversion stage (not shown) to a second IF signal and subsequently demodulated to supply the decoded command signal. Means of construction of the receiver 28 are well known to those skilled in the art.

In response to receiving a coded command signal having associated addressing data, the receiver 28 outputs a decoded command signal to the switch 32 along a conductor 40. If the decoded command signal includes command data for initiating a load control operation, the switch 32 interrupts distribution or electrical energy supplied from the electrical distribution network 14 to the space conditioning load 16 by opening a conductive path normally formed between conductors 36 and 38. By reducing the operating duty cycle of controlled loads, the utility can control energy consumption during peak periods or power consumption.

For the preferred embodiment, the radio controlled switch 32, otherwise described as a switching means, removes the load 16 from the network 14 for a selected time period. Upon expiration of the selected time period, the switch 32 restores the load 16 to the network 14 by again connecting the conductor 36 to the conductor 38. The selected time period can be either a predetermined fixed time period or a variable time period. For many utility load management operations, the fixed time period typically has a minimum duration of 7.5 minutes and a maximum duration of 15 to 30 minutes. The time interval associated with the variable time period is dependent upon the historical duty cycle or run time of the space conditioning load. It will be 35 appreciated that the switch 32 also can operate to restore the load 16 in response to another selected decoded command signal containing command data for initiating load restoration.

The switch 32 preferably disconnects or restores the load 16 to the network 14 only after the expiration of a time delay, which is a time interval that is independent from the selected time period. The time delay operates to delay the start of a load control operation for a predefined time interval after reception of the decoded command signal or, alternatively, to delay the completion of the load control operation upon expiration of the selected time period. To allow each switch 32 to operate with a different time delay, the length of the time delay is based upon a pseudo-random timing function. Consequently, the negative impact of instantaneously removing or restoring a large number of loads within the electrical distribution network 14 is prevented because nearly every switch 32 in the network will have a different load control operation start or completion time. In this manner, load control operations for the network 14 are conducted in a gradual, graceful manner by each controller 27, otherwise referred to as a control means.

It will be appreciated that the time delay can be set to zero by the utility to supply instantaneous initiation of a load control operation after reception of the appropriate decoded command signal. Thus, the switch 32 also can be programmed to instantaneously implement a load shedding operation if required for certain load control scenarios.

The temperature sensing device 34 operates to sense or measure the space temperatures within the closed environment 20. If a measured space temperature exceeds a maximum space temperature limit, the temperature sensing device 34, otherwise described as a temperature sensing means, applies an override signal to the switch 32 via a conductor 42. Likewise, if a measured space temperature drops below a minimum space temperature limit, the temperature sensing device 34 outputs the override signal. If the switch 32 is conducting a load control operation when the override signal is received, the switch 32 responds to the override signal by restoring distribution of electrical energy from the network 14 to the load 16. By overriding the load control operation prior to expiration of the selected time period, the space conditioning function of the load 16 is enabled because it once again has access to the source of electrical energy.

The override signal causes the switch 32 to insert the load 16 within the network 14 regardless of any interval remaining for completing a load control operation during the selected time period. The switch 32 also will not implement another load control operation in response to the utility's command when the override signal is present on the conductor 42. This permits the customer to achieve a certain level of comfort during the utility's load control operations by restoring energy to the load 16 prior to a time that the temperature within the closed environment reaches an extreme level.

A memory storage device 46 can be connected to the temperature sensing device 34 via a signal path 47. Both the maximum and minimum space temperature limits can be stored within the memory storage device 46 prior to installation of the load control device 12 at the site of the load to be controlled. Those persons skilled in the art will appreciate that the memory storage device 46 also can be connected to the switch 32 via a conductor 48. Furthermore, it will be understood that both the switch 32 and the temperature sensing device 34 can share access to the stored contents of the memory storage device 46 if both devices are connected to the memory storage device 46.

Alternatively, the command center 18 can transmit a selected coded command signal 26 containing certain command data for setting the maximum and minimum space temperature limits. Upon reception by the receiver 28, the maximum and minimum space temperature limits are stored within the memory storage device 46. Depending upon which device is directly connected to the memory storage device 46, the decoded command data containing the temperature limits are either passed to the memory storage device 46 from the switch 32 via the conductor 48 or passed to the temperature sensing device 34 from the switch 32 via the signal path 44 and thereafter stored within the memory storage device 46.

The temperature sensing device 34 can be implemented as a temperature measurement component, such as a thermistor, which senses space temperatures and outputs temperature signals representing measured space temperatures within the closed environment. Each temperature signal has a value corresponding to a sensed space temperature. For this implementation, the temperature sensing device 34 outputs the temperature signals to the switch 32 of the controller 27. As described in more detail below with respect to FIG. 3, the switch 32 preferably includes a microprocessor that is programmed to override any load shedding operations when the switch 32 receives certain temperature signals. Accordingly, certain temperature signals operate as an override signal for causing the switch 32 to override any load control operation remotely initiated by the utility. The switch 32 responds to the certain temperature signals by restoring distribution of electrical energy from the network 14 to the load 16. Furthermore, the switch 32 will not implement another load control operation in response to the utility's command while one of the certain temperature signals is supplied to the switch 32 by the temperature sensing device 34.

If the space conditioning load 16 is an air conditioning system, the switch 32 restores distribution of electrical power to the load 16 in response to receiving a temperature signal having a value corresponding to a sensed space temperature that exceeds a maximum space temperature limit. Alternatively, if the space conditioning load is a forced air heating system, the switch 32 restores electrical power to the load 16 in response to receiving a temperature signal having a value corresponding to a sensed space temperature that drops below a minimum space temperature limit. It will be appreciated that the maximum space temperature limit is typically a higher space temperature than the minimum space temperature limit.

Those skilled in the art will appreciate that the space conditioning operations conducted by the space conditioning load 16 within the closed environment 20 are normally controlled by a conventional thermostat system. The thermostat measures space temperatures within the closed environment 20 and controls space conditioning operations in response to comparing the sensed temperatures to a control temperature setpoint that is typically set by the consumer. The maximum space temperature limit is preferably greater than the control temperature setpoint when the load 16 operates in the cooling mode and the minimum space temperature limit is preferably less than the control temperature setpoint when the load 16 operates in the heating mode. Accordingly, if the temperature sensing device 34 senses a space temperature that exceeds the maximum space temperature limit, the switch 32 will restore electrical power to the space conditioning load 16, thereby allowing the load 16 to initiate a cooling operation in response to the control temperature setpoint. Likewise, the switch 32 will restore electrical energy to the space conditioning load 16 when the temperature sensing device 34 measures a space temperature that drops below the minimum space temperature limit, thereby enabling the load 16 to initiate a heating operation in response to the control temperature setpoint.

The temperature sensing device 34 is preferably installed within the closed environment to permit accurate measurements of space temperatures of the environment 20. The remaining components of the load control device 12 can be housed within a separate enclosure and installed on or adjacent to the space conditioning load 16, which is typically located outside of the closed environment 20. Nevertheless, it will be appreciated that the controller 27, comprising the receiver 28, the receiving antenna 30 and the switch 32, and the temperature sensing device 34 and the memory storage device 46 can be housed within a single enclosure and positioned within the closed environment 20. This single housing for the load control device 12 minimizes external wiring connections and reduces enclosure manufacturing and installation expenses.

Figure 2:
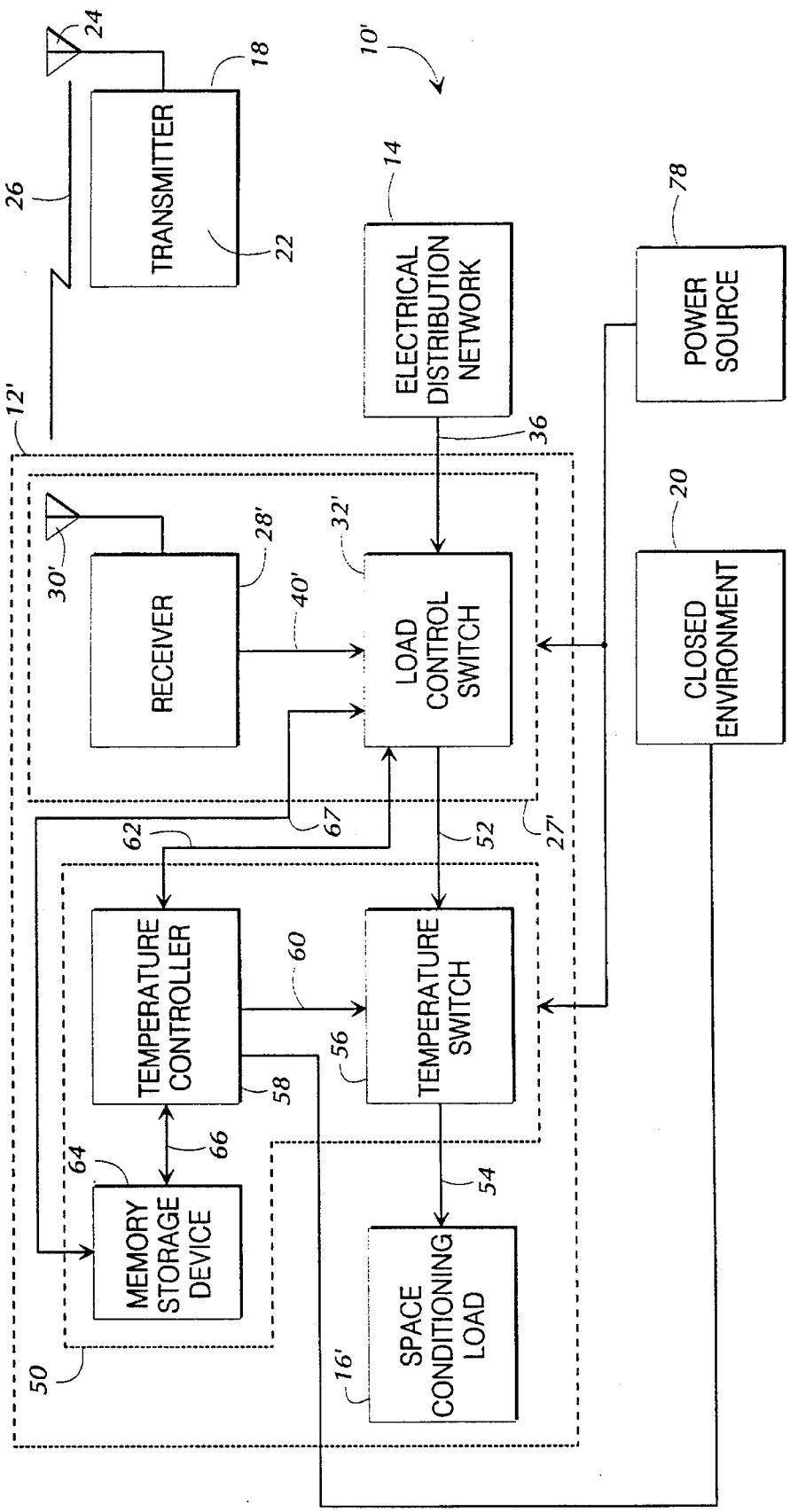
FIG. 2 is a block diagram of another embodiment of the present invention.

FIG. 2 is a block diagram showing another embodiment, an electrical load management system 10'. Referring now to FIG. 2, the electrical load management system 10' includes a load control device 12', the electrical distribution network 14, and the space conditioning load 16'. The load control device 12' includes a controller 27' connected to a load operation control device 50. The load operation control device 50, which is also described as a thermostat, controls the space conditioning operations of the load 16' by measuring space temperatures within the closed environment 20 and comparing the measured space temperatures to the control temperature setpoint of the device 50.

The controller 27' comprises a receiver 28' for receiving coded command signals 26 via a receiving antenna 30', and a load control switch 32' for controlling distribution of electrical energy from the network 14 to the load 16' in response to a decoded command signal applied via the conductor 40'. The load control switch 32' is connected to the load 16' via the load operation control device 50. In the event that the controller 27' is not conducting a load shedding operation, the load operation control device 50 operates to control the space temperature within the closed environment 20.

The load control device 12' further includes the load operation control device 50, which controls the load 16' either by energizing the load 16' or by powering down the load 16' in response to comparing measured space temperatures to the control temperature setpoint. The load operation control device 50 energizes the load 16' by completing a signal path between conductors 52 and 54, thereby supplying electrical energy from the network 14 via the load control switch 32'. In contrast, the load operation control device 50 powers down the load 16' by opening the signal path between the conductors 52 and 54, thereby preventing electrical energy from reaching the load 16'.

It will be appreciated that the load operation control device 50 controls the space conditioning operations of the load 16' in an manner similar to a conventional thermostat, such as an electronic programmable thermostat.

Specifically, in the absence of a command signal 26 for initiating a load control operation, electrical energy is supplied from the electrical distribution network 14 along a signal path formed by the conductor 36, the load control switch 32' operating in a closed switch position, the conductor 52 connecting the switch 32' to the load operation control device 50, and the conductor 54 connecting the load 16' to the device 50. Accordingly, control over space conditioning operations by the load operation control device 50 is enabled when the load control switch 32' operates in the closed switch position.

For example, if the space conditioning load 16' is an air conditioning system, the load operation control device 50 passes electrical energy supplied by the network 14 to the load 16' when a measured space temperature exceeds the control temperature setpoint and interrupts the flow of energy when the measured space temperature is below the control temperature setpoint. In contrast, if the space conditioning load is a forced air heating system, the load operation control device 50 energizes the load 16' when a measured space temperature drops below the control temperature setpoint and interrupts distribution when the measured space temperature is above the control temperature setpoint.

If the load control switch 32' is operating in the open switch position for a load control operation, the conductive path between the conductors 36 and 52 is broken and distribution of electrical energy to the load 16' is thereby interrupted. This normally prevents the load operation control device 50 from controlling the space conditioning operations of the load 16' because the load operation control device 50 can no longer control the flow of energy to the load 16'. By denying the load operation control device 50 access to electrical energy, the utility defeats the consumer's control of space conditioning operations and reduces energy consumption during peak demand periods.

To prevent overheating or overcooling during a load control operation, the load operation control device 50 causes the switch 32' to override the utility's energy control operation when the load operation control device 50 measures a space temperature in the closed environment 20 that exceeds a maximum limit or drops below a minimum limit. Upon measuring such a space temperature, the load operation control device 50 outputs an override signal via the conductor 62 that causes the load control switch 32' to operate in a closed switch position, thereby completing the conductive path necessary for distribution of electrical energy. The load control switch 32' restores energy to the load 16' in response to the override signal even if the selected time period for the load shedding operation has not yet expired. Assuming that the utility's preselected maximum space temperature limit exceeds the consumer's control temperature setpoint, the load operation control device 50 thereafter enables cooling operations by an air conditioning unit because the load operation control device 50 once again has access to energy from the network 14. Similarly, if the minimum space temperature limit is below the control temperature setpoint, the load operation control device 50 enables heating operations by a forced air heating system because electrical energy is once again supplied to the load operation control device 50.

The load operation control device 50 includes a temperature switch 56 connected between the space conditioning load 16' and the load control switch 32' and a temperature controller 58 connected to the temperature switch 56 via a conductor 60 and located proximate to the closed environment 20. A memory storage device 64 also can be connected to the temperature controller 58 via a signal path 66 for storage of the maximum and minimum space temperature limits.

A conductive signal path is formed between the conductors 52 and 54 when the temperature switch 56 operates in the closed switch position, also described as a first operating state, thereby enabling space conditioning operations by the load 16'. In contrast, when the temperature switch 56 operates in the open position, otherwise referred to as a second operating state, a conductive path between the conductors 52 and 54 is broken, thereby interrupting distribution of electrical energy to the load 16'. This terminates any space conditioning operations by the load 16' In the absence of a load control operation, the operating state of the temperature switch 56 determines whether the load 16' receives electrical energy from the network 14.

The operating state of the temperature switch 56, also described as a temperature switching means, is controlled by the temperature controller 58 in response to a control temperature setpoint set by the consumer. The temperature controller 58 senses space temperatures within the closed environment 20 and controls the operating state of the temperature switch 56 by comparing the sensed temperatures to the control temperature setpoint. For cooling operations, if the temperature controller 58 measures a space temperature that exceeds a control temperature setpoint set by the consumer, then the temperature controller 58 outputs an enable signal via the conductor 60 to cause the temperature switch 56 to enter the first operating state and operate in the closed position. In contrast, if the measured space temperature is below the thermostat temperature level, the temperature switch 56 remains in the open position and operates in the second operating state to prevent space conditioning operations. For heating operations, the temperature controller 58 applies the enable signal to the temperature switch 56 when the temperature controller measures a space temperature that drops below the control temperature setpoint, thereby causing the temperature switch 56 to enter the closed position. However, the temperature switch 56 remains in the open position in the event that the space temperature remains above the thermostat temperature level.

If the space conditioning load 16' operates in the cooling mode, the temperature controller 58 outputs an override signal via the conductor 62 to the load control switch 32' in response to measuring a space temperature that exceeds a maximum space temperature limit. This causes the load control switch 32' to interrupt the load shedding operation by restoring distribution of electrical energy to the load 16'. In the event that the maximum space temperature limit is greater than the control temperature setpoint, the temperature switch 56 enters the first operating state and operates in the closed position, thereby allowing electrical power to be delivered to the space conditioning load 16'. This initiates a cooling operation by the load 16', thereby cooling the closed environment 20 prior to expiration of the selected time period for terminating the load shedding operation.

In contrast, if the space conditioning load 16' operates in the heating mode, the temperature controller 58 outputs the override signal via the conductor 62 to the load control switch 32' when a sensed temperature drops below the minimum space temperature limit. In turn, the load control switch 32' restores distribution of electrical energy prior to expiration of the selected time period. In the event that the minimum space temperature limit has a value that is lower than the control temperature setpoint, the temperature controller 58 causes the temperature switch 56 to enter the closed position and to operate in the first operating state. This provides a conductive path between the conductors 52 and 54, thereby allowing electrical energy to flow from the load control switch 32' to the space conditioning load 16'. In response, the load 16' conducts a heating operation.

For another embodiment, the temperature controller can generate temperature signals in response to sensing space temperatures within the closed environment 20. Each of the temperature signals has a value corresponding to a sensed space temperature. The temperature controller 58 sends the temperature signals to the load control switch 32' via the conductor 62. If a temperature signal corresponds to a sensed space temperature that exceeds a maximum space temperature limit, the load control switch 32 responds by overriding any load shedding operation and restoring distribution of electrical energy to the space conditioning load 16' (cooling operation). Likewise, if a temperature signal corresponds to a sensed space temperature that drops below a minimum space temperature limit, the load control switch 32' responds in a like manner by overriding any load control operation (heating mode). In this mode, electrical energy is restored to the space conditioning load 16' via the temperature switch 56 prior to expiration of the selected time period associated with the load control operation.

Referring still to FIG. 2, the memory storage device 64 is useful for storing the values of the maximum and minimum space temperature limits, which are typically preset prior to installation of the load operation control device 50 within or proximate to the closed environment 20. However, the command center 18 also can transmit a certain coded command signal 26, including command data representing the maximum and minimum space temperature limits, to the controller 27'. The receiver 28' receives the certain coded command signal 26 via the receiving antenna 30' and outputs a corresponding decoded command signal to the temperature controller 58 via the load control switch 32' and the conductor 62. The temperature controller 58, also described as a temperature controller means, thereafter writes the maximum and minimum space temperature limits to the memory storage device 64 via the signal path 66.

Those persons skilled in the art will appreciate that the memory storage device 64 also can be directly connected to the load control switch 32' via a signal path 67. This permits the switch 32' to directly read maximum and minimum space temperature limits that are stored within the memory storage device 65 and/or to write those limits into the device 64.

The memory storage device 64 is preferably a PROM. However, it will be appreciated that other types of memory storage components can be used for the memory storage device 64, including random access memory (RAM). In particular, the memory storage device 64 can be implemented as RAM to allow the utility to remotely program the maximum and/or minimum space temperature limits by transmitting the coded command signals 26 containing such information to the controller 27'.

For the preferred embodiment, the load operation control device 50 is a conventional thermostat which has been modified to override the utility's load shedding operation by outputting the load override signal. Means of construction of a conventional thermostat, including electronic programmable thermostats, are well known to those skilled in the art. The preferred load operation control device 50 is a modified model 44422 manufactured by Hunter, located in Memphis, Tenn.

A compressor for a typical air conditioning system supports cooling operations by pressurizing Freon at a high pressure level, typically greater than 300 pounds per square inch (PSI). It will be appreciated that the compressor does not instantaneously reach this high pressure level. Accordingly, if the compressor stops pressurizing operations, it cannot instantaneously return to the high pressure level for the next operation. If the space conditioning load 16' is an air conditioning system, the controller 27' is preferably programmed to delay restoring electrical energy to the load 16' for a predetermined interrupt period at the conclusion of a load shedding operation or in response to the override signal. This interrupt period is intended to provide a sufficient time interval for the compressor to bleed off any high pressure level prior to starting a new compressor operation. The preferred minimum interrupt period is approximately 7.5 minutes, which is a sufficient time interval for a compressor to bleed off approximately 300 PSI. The function of the interrupt period is to delay the possible termination of a load shedding operation immediately after the load control switch 32' removes the load 6' from the network 14, thereby allowing the compressor to bleed off any high pressure level prior to restoring electrical energy to the load 16'.

Figure 3A:
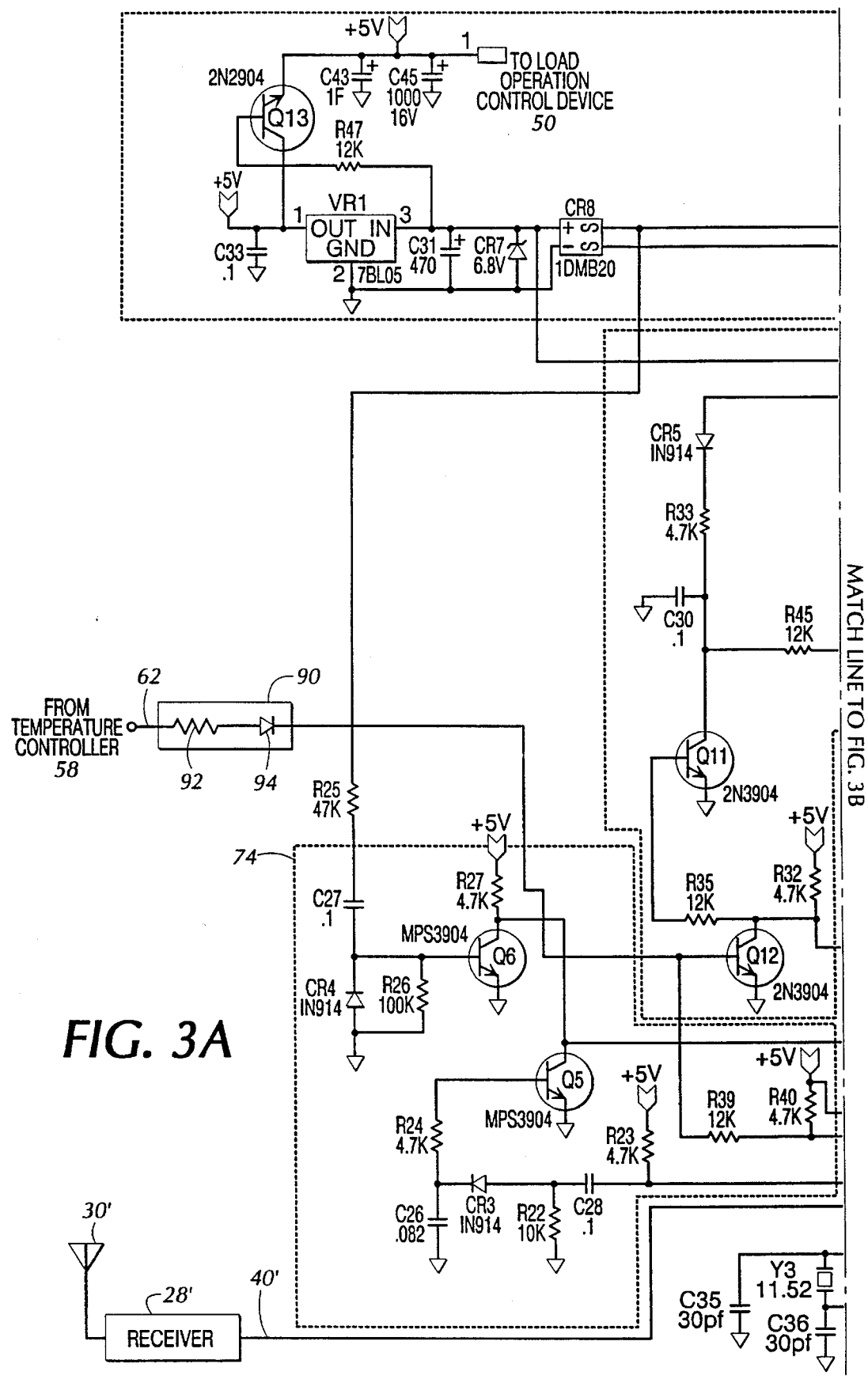
FIG. 3 is a schematic of the preferred circuit for the load control switch of the present invention.
Figure 3B:
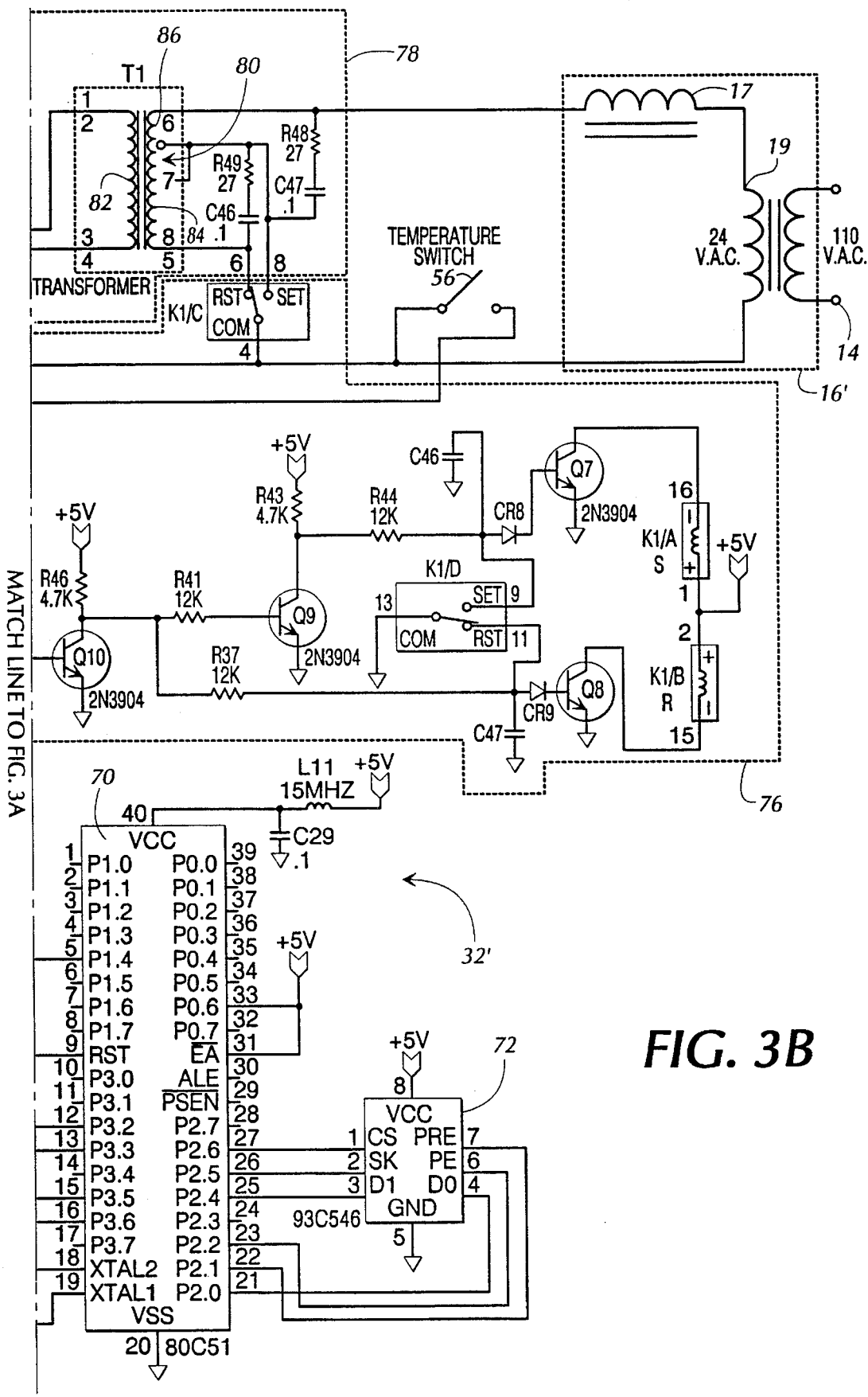

FIG. 3 shows a schematic for the preferred circuitry that implements the load control switch 32' of the controller 27'. Referring now to FIGS. 2–3, the load control switch 32' includes a microprocessor 70, a memory storage device 72, a watchdog circuit 74, and a control circuit 76. The microprocessor 70, which is connected to the memory storage device 72, controls the operating state of the control circuit 76 in response to command signals 26 transmitted by the command center 18. The memory storage device 72 stores the maximum and minimum space temperature limits. The watchdog circuit 74 resets microprocessor operations to a known operating state when power is initially applied to the switch 32' or the processor enters a fault state. The control circuit 76 controls distribution of electrical energy to the space conditioning load 16' in response to instructions from the microprocessor 70 or the load operation control device 50.

The space conditioning load 16' is an air conditioning system having a compressor relay 17 and a step-down transformer 19. Although the described embodiment is configured for use with an air conditioning system, those persons skilled in the art will recognize that the circuit shown in FIG. 3 for the load control switch 32' can be adapted to operate with an electrical heating system, such as a forced air furnace.

The power source 78, which includes a primary 80 and a secondary 82, supplies a direct current (DC) voltage to power the controller 27', including both the receiver 28' and the switch 32', and the load operation control device 50.

The load control switch 32' operates in one of two operating states, either a reset state or a set state. In the reset state, the load control switch 32' operates in the open position and disconnects the network 14 from the load operation control device 50, thereby temporarily interrupting electrical energy to the space conditioning load 16'. Alternatively, for the set state, the load control switch 32' operates in the closed position and completes the conductive path necessary for distribution of energy to the load operation control device 50 from the network 14. The load control switch 32' normally operates in the set state to permit the load operation control device 50 to control space conditioning operations.

The microprocessor 70, which is preferably a model 80C51 processor manufactured by Intel Corporation, located in Santa Clara, Calif., accepts decoded command signals from the receiver 28' via the conductor 40'. In response to command data for initiating a load control operation, the microprocessor sets port P1.4 to a TTL high level for a selected time period. This causes the control circuit 76, which is connected to the temperature switch 56, the microprocessor 70, and the power source 78, to enter the reset state for interrupting electrical energy to the space conditioning load 16. The memory storage device 72, preferably a PROM, stores the data that defines the selected time period for power interruption. Upon expiration of the selected time period, the microprocessor 70 sets the port P1.4 to a TTL low level and the control circuit 76 enters the set state to restore electrical energy to the space conditioning load 16'.

In the absence of a command signal 26 for initiating a load control operation, the control circuit 76 monitors the operating state of the temperature switch 56. When the temperature switch 56 enters the first operating state and operates in the closed position, the control circuitry 76 enters the set state and electrical energy is distributed to the load 16'. The control circuit 76 energizes the compressor relay 17 when the temperature switch 56 closes, thereby initiating a cooling operation by the load 16'. Alternatively, to terminate a cooling operation, temperature switch 56 enters the second operating state and operates in the open position. The control circuit 76 thereafter enters the reset state and interrupts distribution of electrical energy. This deenergizes the compressor relay 17 of the air conditioning system and forces the termination of any cooling operation. The operation of the load control switch 32' is transparent to the consumer in the absence of a command signal 26 for initiating a load control operation.

The control circuit 76 includes transistors Q7, Q8, Q9, Q10, Q11, and Q12 and a relay K1 comprising coils K1/A and K1/B and switches K1/C and K1/D. Each of the transistors Q7–Q12 is preferably an NPN transistor, such as the model 2N3904.

In response to the operating state of the relay switch K1/C, the power transformer T1 steps up or steps down the current output by the power source 78. Specifically, the switch K1/C connects either a first primary 84 or a second primary 86 of the power transformer T1 to electrical energy supplied by the network 14 via the step-down transformer 19. For the switch K1/C, the RST port is connected across the second primary 86 via a resistor R49 and a capacitor C46, the SET port is connected across the first primary 84 via a resistor R48 and a capacitor C47, and the COM port is connected to the positive port of the bridge rectifier CR8, the wiper of the temperature switch 56, and the step-down transformer 19.

The switch K1/D operates to connect the base terminal of either the transistor Q7 or the base terminal of the transistor Q8 to ground in response to the operating state of the control circuit 76. For the switch K1/D, the SET port is connected to the base of the transistor Q7 via a diode CR8, the RST port is connected to the base of the transistor Q8 via a diode CR9, and the COM port is connected to ground. The base of the transistor Q7 is also connected to a capacitor C46 tide to ground and to the collector of the transistor Q9 via a resistor R44. The base of the transistor Q8 is further connected to a capacitor C47 tied to ground and to the base of the transistor Q9 via resistors R37 and R41 and to the collector of the transistor Q10. The emitter for each of the transistors Q7 and Q8 is grounded and the collector for each of those transistors is respectively connected to the relay coils K1/A and K1/B. The other side of each of the relay coils K1/A and K1/B is connected to a common node that is tied to +5 volts.

Positive five volts is supplied to each of the collectors of the transistors Q9 and Q10 via, respectively, resistors R43 and R46. The emitter terminal for each of those transistors is connected to ground. The base of the transistor Q9 is connected to the collector of the transistor Q10 via a resistor R41. The base of the transistor Q10 is connected to the collector of the transistor Q11 via a resistor R45. The collector of the transistor Q11 is also connected to the non-wiper terminal of the temperature switch 56 via a series combination of a diode CR5 and a resistor R33. Specifically, the anode of the diode CR5 is connected to the non-wiper terminal, the cathode is connected to one terminal of the resistor R33, and the remaining terminal of the resistor R33 is connected to the collector of the transistor Q11. The emitter of the transistor Q11 is connected to ground and the base is connected to the collector of the transistor Q12 via a resistor R35. The collector of the transistor Q12 is further connected to port P1.4 of the microprocessor 70, which is tied to +5 volts via a pull-up resistor R32. The emitter of the transistor Q12 is connected to ground and the base is connected to port P3.3 of the microprocessor 70 via a resistor R39. The port P3.3 is also connected to +5 volts via a pull-up resistor R40 and the port P3.2 is connected directly to +5 volts.

When the load control switch 32' is not implementing a load control operation, the closure of the temperature switch 56 causes a DC voltage to be applied to the base of transistor Q10 via the signal path formed by the diodes CR5, the resistor R33, and the resistor R45. This DC voltage causes the transistor Q10 to turn ON. In response, the transistors Q7 and Q9 enter the ON state and the relay coil K1/A is energized, thereby causing the switches K1/C and K1/D to switch to the SET position from the RST position.

When the temperature switch 56 opens to terminate the cooling operation by the load 16', the transistor Q10 turns OFF because the DC voltage is no longer applied to the base of that transistor. In turn, the transistor Q8 turns ON and energizes the relay coil K1/B. This causes the relay switches K1/C and K1/D to switch from the SET position to the RST position. In the RST position, distribution of electrical energy to the space conditioning load 16' is interrupted.

The relay switch K1/D permits the transistors Q7 and Q8 to turn ON for a time period sufficient only to energize their respective relay coils K1/A and K1/B. This prevents those transistors from draining current from the power source 78 over an extended time period. For example, when the transistor Q7 energizes the relay coil K1/A, the relay switch K1/D thereafter changes operating states and connects the base of the transistor Q7 to ground. This forces the transistor Q7 to enter the OFF state for as long as the switch relay K1/D operates in that switch position. The relay K1 is a latching relay that changes operating states only when a relay coil is energized.

In the event of receiving decoded command data for initiating a load control operation, the transistor Q11 is turned ON by the application of a TTL high level to the base terminal from the port P1.4. When the transistor Q11 turns ON, the signal path between the temperature switch 56 and the base of the transistor Q11 is shorted to ground. This prevents distribution of electrical energy to the space conditioning load 16' even when the temperature switch 56 closes to initiate a cooling operation. Both relay switches K1/C and K1/D normally operate in the RST state when the transistor Q11 turns ON. Accordingly, the space conditioning load 16 cannot conduct any space conditioning operation for the predetermined time period that the port P1.4 remains at the TTL high level period. The preferred selected time period is approximately 7.5 minutes and is assignable by coefficients stored within the memory storage device 72.

During initial power-up, some ports of the microprocessor 70 change states during the initialization operation. The transistor Q12 operates as an anti-chatter circuit to prevent the controlled load from briefly cutting ON or OFF when the microprocessor 70 is initially powered. The transistor Q12 prevents this signal chatter from affecting the distribution of electrical energy to the air conditioning system. The operating state of the transistor Q12 is controlled by the signal level present at the port P3.3 When the port P3.3 is set to a TTL high level during an initialization operation, the transistor Q12 turns ON. In response, the base of the transistor Q11 is grounded during the microprocessor initialization operations and the transistor Q11 turns OFF. This eliminates the opportunity for a state change by port P1.4 to affect the operation of the load 16' during initial power-up of the load control device 12'.

To override a load control operation, the temperature controller 58 outputs an override signal having a TTL high level via a conductor 62 to an override circuit interface 90. The interface 90 includes a series combination of a resistor 92 and a diode 94 connected between the conductor 62 and the base terminal of the transistor Q12. In response to the override signal, the interface 90 applies a TTL high level to the base of the transistor Q12, thereby turning the transistor Q12 ON and causing the transistor Q11 to turn OFF. This prevents the microprocessor 70 from interrupting the normal operation of the load operation control device 50. Thus, when the transistor Q11 enters the OFF state, any load control operation is interrupted and the controller 27' fails to respond to command data for initiating a load shedding operation. Assuming that the maximum space temperature limit exceeds the control temperature setpoint for the load operation control device 50, the temperature switch 56 is operating in the closed position to initiate a cooling operation by the load 16'. In this manner, electrical energy is supplied by the network 14 to the load 16 prior to expiration of the selected time period for the load control operation.

The watchdog circuit 74, which is connected to the reset port (RST) of the microprocessor 70 and ports P3.3 and P3.5, resets microprocessor operations upon initial power-up of the load control switch 32' or upon detection of a microprocessor fault state. Microprocessor operations are reset to a known operating state in response to the application of a reset pulse to the reset port.

The power source 78 outputs a 60 Hertz power signal to a base terminal of a transistor Q6 via a shaping circuit formed by a capacitor C27, a diode CR4, and a resistor R26. For the transistor Q6, the collector terminal is connected to +5 volts via a resistor R27, and the emitter terminal is connected to ground. A terminal of each of the capacitor C27, the cathode of the diode CR4, and the resistor R26 is connected to a common node at the transistor base. The other terminal of the capacitor C27 is connected to the power source 78 via a resistor R25, and both the anode of the diode CR4 and the remaining terminal of the resistor R26 are tied to ground. In response to the 60 Hertz power signal, the shaping circuit applies a square wave signal to the base of the transistor Q6 which, in turn, outputs a reset signal comprising square wave pulses to the microprocessor reset port. In response, the microprocessor 70 resets operations and enters a known operating state.

During normal operation of the microprocessor 70, a square wave signal is present at the port P3.5. The square wave signal at the port P3.5 is applied via a pull-up resistor R23 to a terminal of a capacitor C28. The remaining terminal of the capacitor 28 is connected to a resistor R22 tied to ground and to the anode of a diode CR3. The capacitor C28 differentiates the square wave signal and applies the differentiated signal to the diode CR3. In turn, the diode CR3 supplies a rectified signal to a common node connected to the cathode of the diode CR3, a terminal of a capacitor C26, and a terminal of a resistor R24. The remaining terminal of the capacitor C26 is tied to ground and the other terminal of the resistor R24 is connected to a base terminal of a transistor QS. For the transistor Q5, the emitter is connected to ground and the collector is connected to the collector of the transistor Q6 and to the microprocessor reset port. The capacitor C26 filters the rectified signal and outputs a filtered signal to the base of the transistor Q5, which causes the transistor Q5 to enter the ON state. When the transistor Q5 is ON, the collector of the transistor Q6 is grounded, which shorts out the reset pulses supplied by the transistor Q6. By preventing the application of a reset pulse to the processor reset port, the microprocessor 70 continues to conduct operations without interruption.

When the microprocessor 70 is initially powered or enters a fault state, the microprocessor 70 typically fails to set the port P3.5 with the square wave signal. In the absence of the square wave signal at the port P3.5, the transistor Q5 will enter the OFF state. This allows the reset pulses supplied via the transistor Q6 to be applied to the reset port, thereby resetting operations of the microprocessor 70.

The power source 78 also supplies a DC voltage of +5 volts to power the receiver 28' and the remaining circuitry for the load control switch 32'. In addition, the power source 78 supplies an operating voltage of +5 volts to power the load operation control device 50. The step-down transformer 19 of the space conditioning load 16 accepts a voltage of approximately 110 volts alternating current (VAC) from the electrical distribution network 14 and steps down this voltage to 24 VAC for powering the space conditioning load 16'. A power transformer T1, which includes the primary 80 connected in series with the compressor relay 17 and the step-down transformer 19 and the secondary 82 connected to a bridge rectifier CR8, steps up or steps down the current output by the power source 78 in response to the operating position of the relay switch K1/C.

The primary of power transformer T1 includes the first primary 84 having a winding containing many turns and the second primary 86 having a winding containing few turns. When the relay K1/C is set to the RST position, the first primary 84 is connected in series with the compressor relay 17 and the step-down transformer 19 via the relay K1/C. In the reset state of the control current 76, a small current of approximately 15 milliamperes circulates through the first primary 84, the compressor relay 17, and the step-down transformer 19. This small current does not activate the compressor relay 17 and, accordingly, the space conditioning load 16' remains in the OFF mode. In contrast, when the control circuit 76 operates in the set state, the relay K1/C operates in the SET position and the second primary 86 of the transformer T1 is thereby connected to the compressor relay 17 and the step-down transformer 19 via the relay K1/C. A very large current energizes the compressor relay 17, thereby causing the space conditioning load 16 to enter the ON mode.

For either the RST or SET positions of the relay K1/C, the secondary 82 of the transformer T1 supplies current to power the controller 27' and the load operation control device 50. For the RST position, the transformer T1 steps-up the small current flowing through the first primary. Alternatively, for the SET position, the transformer T1 steps down the very large current flowing through the second primary. Accordingly, operating power for the controller 27' and the load operation control device 50 is derived from the compressor power supply of the space conditioning load 16' for both operating states.

The secondary 82 is connected to a bridge rectifier CR8, which full-wave rectifies the AC voltage supplied by the transformer secondary. For the bridge rectifier CR8, the signal ports are connected to the transformer secondary windings, a negative port is connected to ground, and a positive port is connected to an input port of a voltage regulator VR1. The cathode of a zener diode CR7 and the positive terminal of a capacitor C31 are also connected to the input port of the voltage regulator VR1. The anode of the zener diode CR7 and the remaining terminal of the capacitor C31 are connected to ground. The bridge rectifier CR8, the zener diode CR7, and the capacitor C31 condition the 60 Hertz AC voltage supplied by the secondary of the transformer T1 to generate a proper DC voltage for application to the voltage regulator VR1. Specifically, the bridge rectifier CR8 rectifies the AC voltage output by the transformer secondary, the zener diode CR7 clamps the rectified voltage, and the capacitor C31 operates as a filter, thereby supplying DC voltage to the input port of the voltage regulator VR1.

The voltage regulator VR1 further conditions the DC voltage and generates a regulated +5 volts to power the controller 27' and the load operation control device 50. The output port of the voltage regulator VR1 directly supplies the regulated voltage of +5 volts to the circuits of the load control device 12'. A capacitor C33, connected between the output port and ground, filters the output of the voltage regulator VR1. The output port also supplies regulated voltage of +5 volts to the load operation control device 50 via a circuit including a transistor Q13, a resistor R47, and capacitors C43 and C45. For the transistor Q13, the base is connected via the biasing resistor R47 to the input port of the voltage regulator VR1, the collector is connected to the output port of the voltage regulator VR1, and the emitter is connected to a power supply terminal for the load operation control device 50.

The capacitors C43 and C45, which are connected between the emitter of the transistor Q13 and ground, are charged in response to the positive voltage supplied by the output port of the voltage regulator VR1 via the transistor Q13. The capacitor C43 is preferably an electrolytic capacitor having a very large capacitance of one Farad. Because the load operation control device 50 draws a low amount of current, the voltage stored by the capacitor C43 can power the load operation control device 50 in the event of a power failure. Accordingly, the load operation control device 50 does not require a battery source to supply emergency back-up power.

The power transformer T1 is a custom made component specified and designed to the compatible with compressor relays associated with certain models of air conditioning systems. Specifically, the preferred power transformer T1 provides the proper impedance match for connection with those certain compressor relays.

As shown in FIGS. 2-3, the load control device 12' is powered by tapping the low voltage control system (24 VAC) of the controlled air conditioner, whereas conventional load management switches are typically powered by the high voltage (240 VAC) of the controlled air conditioning system. In contrast to prior art systems, both the thermostat function and the load control function are powered by a single power source, namely the power source 78. This permits the sate and relatively simple installation of the device 12' by a person other than a licensed electrician or a skilled technician, thereby reducing the cost of installation at a consumer's location. The use of a single low power source to power the load control device 12' is significant because the preferred power source 78 derives power from the available 24 VAC control wiring of the air conditioning system. By tapping into the available control wiring, the load control device 12' can be conveniently installed and maintained within the closed environment of the consumer's residence or business.

The inventors believe that the novel combination of the functions of a thermostat (load control operation device 50) and a load management switch (the controller 27', comprising the receiver 28' and load control device 32') within the same housing will permit a consumer to easily install their invention in the same manner as conventional electronic programmable thermostats that are sold in "do it yourself" stores.

It will be appreciated that combining the functions of a thermostat and radio switch within the same housing, as envisioned by the inventors, provides the additional benefit of minimizing the opportunities for a consumer to remove or bypass the load control device 12' because this also would effectively render the controlled load 16' inoperable. By reducing the opportunities for a consumer or a service person to tamper with the load control device 12', the utility can confidently rely upon the demand reductions associated with each installed load control device 12' during peak load conditions.

Figure 4:
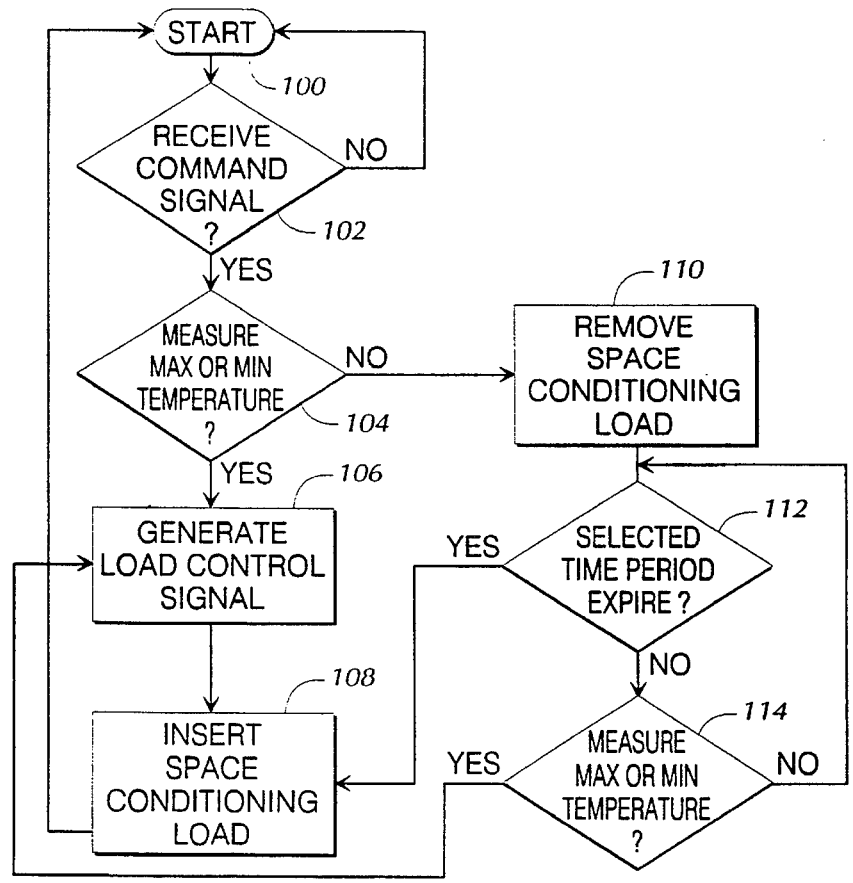
FIG. 4 is a flow chart showing the steps of a method for overriding a load shedding operation in response to measuring certain space temperatures within a closed environment.

FIG. 4 shows a flow chart for the steps conducted during a load control operation. Referring now to FIGS. 2 and 4, the load control operation starts at step 100 and proceeds to step 102. If the receiver 28' receives a command signal 26 via the receiving antenna 30' during step 102, the YES branch is followed to step 104. At step 104, an inquiry is conducted to determine if the temperature controller 58 has measured a space temperature within the closed environment 20 that exceeds the maximum space temperature limit (cooling mode) or drops below a minimum space temperature limit (heating mode). If the measured space temperature exceeds the maximum space temperature limit or drops below the minimum space temperature limit, the YES branch is followed to step 106. In step 106, the temperature controller 58 outputs the override signal via the conductor 62 to the load control switch 32'. In response, during step 108, the switch 32' restores distribution of energy from the network 14 to the load 16'. After insertion of the load 16' within the network 14, the process is begun again at the start of step 100.

In contrast, during step 104, if the temperature controller 58 does not measure a space temperature that exceeds the maximum space temperature limit (cooling mode) or drops below the minimum space temperature limit (heating mode), the NO branch is followed to step 110. In response to the decoded command signal output by the receiver 28', the load control switch 32' during step 110 interrupts distribution of energy by removing the load 16' from the network 14. At step 112, if the selected time period for the load control operation has expired, the YES branch is followed to step 108 and the load control switch 32' thereafter inserts the load 16' within the network 14. However, if the selected time period has not expired, the NO branch is followed to step 114. During step 114, an inquiry is conducted as to whether the temperature controller 58 has measured a space temperature within the closed environment 20 that exceeds a maximum space temperature limit (cooling mode) or drops below a minimum space temperature limit (heating node). If positive, the YES branch is followed to step 106. However, if the inquiry is negative, the NO branch is followed to step 112.

Referring again to FIGS. 2-3, those persons skilled in the art will recognize that it is common practice to delay for a relatively short time period the actual implementation of a control operation, such as the removal or the insertion of a controllable load, to prevent rapid power excursions on the utility's electrical distribution network. This time delay generally is different for each controlled load and is often selected on a pseudo random basis. Thus, it will be appreciated that such a time delay can occur prior to the controller 27' inserting the load 16' in the step 108 or removing the load 16' in the step 110. In contrast, conventional thermostats, which are directed to controlling space conditioning operations for the sole convenience of the consumer, do not take into account the overall effect of the operation of many such devices upon the utility's electrical distribution network.

It will be appreciated that the load control device 12' allows a consumer to conserve energy by selecting an appropriate energy saving control temperature set point of the load operation control device 50, and further permits a utility to control peak energy demand by conducting load shedding operations for loads controlled by the combination of the receiver 28' and the switch 32'. For conventional load control devices, utilities typically give consumers a credit on their utility bill for each month that the utility has the consumer's permission to control its space conditioning load 16', such as an air conditioner. However, the inventors foresee that such an economic reward by the utility will not be necessary for installation of their invention at the consumer's location because the consumer will receive the benefit of using the thermostat portion of the system 12' to control space conditioning operations.

For example, if the load operation control device 50 is implemented as an electronic programmable thermostat, the consumer will receive the benefit of selecting or otherwise programming control temperature setpoints for certain hours during weekdays and weekends, thereby supporting an automated method for energy conservation that conveniently fits the consumer's schedule. This allows the consumer to save money based upon reduced energy consumption, conserves natural energy resources, and allows the utility to implement an economical peak energy demand control program. Furthermore, in the event that the space temperature exceeds preset limits during a load shedding operation, the load control operation device 50 regains control over space conditioning operations and allows the space temperature to be set to a level acceptable to the consumer.

It will be understood that the load control device 12' can operate with an adaptive algorithm that permits the device to learn the historical duty cycle of the controlled load by monitoring the ON/OFF cycles of the load 16' for selected intervals during a predetermined time period. The adaptive algorithm allows the load control device 12' to reduce the historical duty cycle of the load 16' by a certain amount specified by a command received from the command center 26 rather than by the conventional manner of reducing the duty cycle by a predetermined amount regardless of the historical duty cycle of the load 16'. For example, a conventional load shedding operation is completed by the utility sending a command signal containing the command to cycle the load at a 50% duty rate for a selected time period. In response to this command signal, only those loads operating at or greater than a 50% duty cycle within the universe of controllable loads will actually be controlled during the peak demand period because the command instructs the controller 27' to implement a 50% duty cycle. This implements an inequitable load shedding operation because the operation of all controllable loads that are operating below a 50% duty cycle are not affected by this command signal. In contrast, the adaptive algorithm would receive a command signal containing a command to reduce the current duty cycle by 10% for a selected time period regardless of the current operating cycle of the load. In response, all loads controlled by this adaptive algorithm will implement a load shedding operation. This adaptive algorithm can be implemented as coded instructions completed by the microprocessor 70 shown in FIG. 3.

In view of the foregoing, it will be understood that the present invention is an improved load control apparatus 12' for controlling distribution of electrical energy by an electrical distribution network 14 to a space conditioning load 16' that conducts space conditioning operations within a closed environment 20. The load control apparatus 12' includes a controller 27', connected to the electrical distribution network 14, for controlling distribution of the electrical energy to the space conditioning load 16' in response to command signals transmitted by a remote command center 18. A thermostat 50, connected to the controller 27' and to the space conditioning load 16', senses space temperatures within the closed environment. In response to sensing a space temperature that corresponds to a control temperature setpoint, the controller 27' controls the space conditioning operations of the load 16'. The controller 27' effectively overrides control by the thermostat 50 of the space conditioning operations when the load control switch 32' removes the space conditioning load 16' from the electrical distribution network 14 for a selected time period in response to a command signal.

The thermostat 50 is further operative to override control by the controller 27' of distribution of the electrical energy to the space conditioning load 16' prior to expiration of the selected time period. To override the load control operation conducted for an air conditioning system, the thermostat 50 outputs a control override signal to the controller 27' in response to sensing a space temperature that exceeds a maximum space temperature limit. This maximum space temperature limit is greater than the control temperature setpoint. In similar fashion, to override the load control operation conducted for a heating system, the thermostat 50 outputs the control override signal to the controller 27' in response to sensing another space temperature that drops below a minimum space temperature limit. The minimum space temperature limit is less than the control temperature setpoint.

The controller 27' restores distribution of the electrical energy to the space conditioning load 16' by inserting the load 16' into the electrical distribution network 14 in response to receiving the control override signal or in response to expiration of the selected time period.

Both the controller 27' (including the receiver 28' and the load control switch 32') and the thermostat 50 are powered by a common power source, namely the power source 78, by preferably drawing 24 VAC power from the control wiring associated with the space conditioning load 16'. This permits economical and relatively simple installation of the load control apparatus 12' because the apparatus is powered by a single low voltage source rather than a high voltage source for the load control function and a low voltage source for the thermostat function.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and scope of the invention.

We claim:

1. An improved load control apparatus for controlling distribution of electrical energy by an electrical distribution network to a space conditioning load that conducts space conditioning operations within a closed environment, the space conditioning operations being controlled by a thermostat in response to the control temperature setpoint of said thermostat, comprising:

control means, connected to said space conditioning load via said thermostat and to said electrical distribution network, for interrupting distribution of said electrical energy to said space conditioning load by removing said space conditioning load from said electrical distribution network for a selected time period in response to a selected one of a plurality of command signals transmitted by a command center that is remotely located from said load control apparatus, said selected time period being a variable time period having a time interval that is dependent upon the historical duty cycle of said space conditioning load; and temperature sensing means, connected to said control means, for sensing space temperatures within said closed environment, said temperature sensing means operative to override control by said control means of distribution of said electrical energy to said space conditioning load prior to expiration of said selected time period by outputting a control override signal to said control means in response to sensing one of said space temperatures that exceeds a maximum space temperature limit, said maximum space temperature limit being greater than the control temperature setpoint.

2. The load control apparatus of claim 1, wherein said temperature sensing means operates to override control by said control means of distribution of said electrical energy to said space conditioning load by outputting said control override signal to said control means in response to sensing another one of said space temperatures that drops below a minimum space temperature limit, said minimum space temperature limit being less than said control temperature setpoint.

3. The load control apparatus of claim 1, wherein said control means restores distribution of said electrical energy to said space conditioning load by inserting said space conditioning load into said electrical distribution network in response to receiving said control override signal or in response to expiration of said selected time period.

4. In an electrical load management system, said system including transmitting means for transmitting coded command signals for causing electrical load reductions from an electrical distribution network, and a load control apparatus located proximate each of a plurality of space conditioning loads for controlling distribution of electrical energy to said space conditioning loads, each of said space conditioning loads operative to conduct space conditioning operations within a closed environment, the space conditioning operations being controlled by a thermostat in response to the control temperature setpoint of said thermostat, said load control apparatus comprising:

receiving means for producing decoded command signals by decoding said coded command signals;

switching means, connected to said receiver means and between said space conditioning load and said electrical distribution network, for interrupting distribution of said electrical energy to said space conditioning load by removing said space conditioning load from said electrical distribution network for a selected time period in response to a selected one of said decoded command signals;

temperature sensing means, connected to said switching means, for sensing space temperatures within said closed environment, said temperature sensing means further operative to output a control override signal to cause said switching means to restore distribution of said electrical energy to said space conditioning load by inserting said space conditioning load into said electrical distribution network prior to expiration of said selected time period in response to sensing one of said space temperatures that exceeds a maximum space temperature limit, said maximum space temperature limit being greater than said control temperature setpoint, or another one of said space temperatures that drops below a minimum space temperature limit, said minimum space temperature limit being less than said control temperature setpoint; and memory storage means for storing said minimum space temperature limit and said maximum space temperature limit.

5. The load control apparatus of claim 4, wherein said control override signal represents a value associated with one of said space temperatures that exceeds said maximum space temperature limit or another value associated with another one of said space temperatures that drops below said minimum space temperature limit.

6. The load control apparatus of claim 4, wherein predetermined values of said minimum space temperature limit and said maximum space temperature limit are communicated to said load control apparatus by said transmitting means transmitting a certain one of said coded command signals.

7. The load control apparatus of claim 6, wherein said memory storage means stores said minimum space temperature limit and said maximum space temperature limit in response to said receiving means decoding said certain one of said coded command signals.

8. The load control apparatus of claim 4, wherein predetermined values of said minimum space temperature limit and said maximum space temperature limit are set prior to installation of said load control apparatus proximate to said closed environment by storing said minimum space temperature limit and said maximum space temperature limit within said memory storage means.

9. A load control apparatus for controlling distribution of electrical energy by an electrical distribution network to a space conditioning load, comprising:

load operation control means, connected to said space conditioning load, for sensing space temperatures within a closed environment and controlling the space conditioning operations of said space conditioning load in response to a control temperature setpoint;

control means, connected to said electrical distribution network and to said load operation control means, for controlling distribution of said electrical energy to said space conditioning load for a selected time period in response to command signals transmitted by a command center, said command center being remotely located from said load control apparatus; and memory storage means for storing a minimum space temperature limit and a maximum space temperature limit in response to said command signals;

said load operation control means operative to output an override signal that causes said control means to restore distribution of said electrical energy to said space conditioning load prior to expiration of said selected time period in response to sensing one of said space temperatures that exceeds said maximum space temperature limit, said maximum space temperature limit being greater than said control temperature setpoint.

10. The load control apparatus of claim 9, wherein said load operation control means is prevented from controlling said space conditioning operations of said space conditioning load when said control means interrupts distribution of said electrical energy to said space conditioning load and said space temperatures are between said maximum space temperature limit and said minimum space temperature limit.

11. The load control apparatus of claim 9, wherein said control means comprises:

receiver means for producing decoded command signals in response to receiving said command signals; and switching means for interrupting distribution of said electrical energy to said space conditioning load by removing said space conditioning load from said electrical distribution network for a selected time period in response to a selected one of said decoded command signals and restoring distribution of said electrical energy to said space conditioning load by inserting said space conditioning load within said electrical distribution network in response to either expiration of said selected time period or reception of said override signal.

12. The load control apparatus of claim 11, wherein said load operation control means comprises:

temperature switching means for connecting said space conditioning load to said electrical distribution network via said control means during a first operating state and disconnecting said electrical distribution network from said space conditioning load via said control means during a second operating state; and temperature controller means, connected to said temperature switching means and to said control means, for controlling operation of said space conditioning load by selecting said first operating state in response to sensing any of said space temperatures that exceeds said control setpoint temperature and selecting said second operating state in response to sensing any of said space temperatures that drops below said control setpoint temperature;

wherein said temperature controller means outputs said override signal to said control means in response to sensing one of said space temperatures that exceeds said maximum space temperature limit.

13. The load control apparatus of claim 11, wherein load operation control means is operative to output an override signal that causes said control means to restore distribution of said electrical energy to said space conditioning load prior to expiration of said selected time period in response to sensing one of said space temperatures that drops below said minimum space temperature limit, said minimum space temperature limit being less than said control temperature setpoint.

14. The load control apparatus of claim 13, wherein said load operation control means comprises:

temperature switching means for connecting said space conditioning load to said electrical distribution network via said control means during a first operating state and disconnecting said space conditioning load from said electrical distribution network via said control means during a second operating state; and temperature controller means, connected to said temperature switching means and to said control means, for controlling operation of said space conditioning load by selecting said first operating state in response to sensing any of said space temperatures that drops below a control temperature setpoint and selecting said second operating state in response to sensing any of said space temperatures that exceeds said control temperature setpoint, wherein said temperature controller means outputs said override signal to said control means in response to sensing one of said space temperatures that drops below said minimum space temperature limit.

15. In an electrical load management system, said system including a transmitter for transmitting coded command signals for managing electrical energy distributed by an electrical distribution network to space conditioning loads, and a load control apparatus located proximate each one of a plurality of said space conditioning loads, said coded command signals comprising address data and command data, wherein each of said load control apparatus is responsive to said command data only for particular predetermined address data, said load control apparatus comprising:

a receiver that produces decoded address data and decoded command data by decoding said coded command signals;

a load control switch, connected to said receiver and to said electrical distribution network, for interrupting distribution of said electrical energy to said space conditioning load for a selected time period in response to selected decoded command data;

a temperature switch that connects said space conditioning load to said load control switch during a first operating state and disconnects said space conditioning load from said load control switch during a second operating state; and a temperature controller, connected to said temperature switch and to said load control switch, for sensing space temperatures within a closed environment and enabling operation of said space conditioning load by selecting said first operating state in response to sensing one of said space temperatures that drops below a control temperature setpoint or disabling operation of said space conditioning load by selecting said second operating state in response to sensing one of said space temperatures that exceeds said control temperature setpoint, said temperature controller operative to output an override signal to said load control switch that causes said load control switch to restore distribution of said electrical energy to said space conditioning load prior to expiration of said selected time period in response to measuring one of said space temperatures that drops below a minimum space temperature limit which is less than said control temperature setpoint, said minimum space temperature limit being communicated to said load control apparatus by said transmitter transmitting a certain one of said coded command signals; and memory storage means for storing said minimum space temperature limit.

16. In an electrical load management system, said system including a transmitter for transmitting coded command signals for managing electrical energy distributed by an electrical distribution network to space conditioning loads, and a load control apparatus located proximate each one of a plurality of said space conditioning loads, said coded command signals comprising address data and command data, wherein each of said load control apparatus is responsive to said command data only for particular predetermined address data, said load control apparatus comprising:

a receiver that produces decoded address data and decoded command data by decoding said coded command signals;

a load control switch, connected to said receiver and to said electrical distribution network, for interrupting distribution of said electrical energy to said space conditioning load for a selected time period in response to selected decoded command data;

a temperature switch that connects said space conditioning load to said load control switch during a first operating state and disconnects said space conditioning load from said load control switch during a second operating state; and a temperature controller, connected to said temperature switch and to said load control switch, for sensing space temperatures within a closed environment and enabling operation of said space conditioning load by selecting said first operating state in response to sensing one of said space temperatures that drops below a control temperature setpoint or disabling operation of said space conditioning load by selecting said second operating state in response to sensing one of said space temperatures that exceeds said control temperature setpoint, said temperature controller operative to output an override signal to said load control switch that causes said load control switch to restore distribution of said electrical energy to said space conditioning load prior to expiration of said selected time period in response to measuring one of said space temperatures that rises above a maximum space temperature limit which is greater than said control temperature setpoint, said maximum space temperature limit being communicated to said load control apparatus by said transmitter transmitting a certain one of said coded command signals; and memory storage means for storing said maximum space temperature limit.

17. An improved load control apparatus for controlling distribution of electrical energy by an electrical distribution network to a space conditioning load, said space conditioning load operative to conduct space conditioning operations within a closed environment, comprising:

temperature sensing means for generating temperature signals in response to sensing space temperatures within a closed environment;

receiving means for producing decoded command signals in response to receiving command signals transmitted by a command center; and switching means, connected to said receiving means and said temperature sensing means, for (a) implementing a load shedding operation by removing said space conditioning load from said electrical distribution network for a selected time period in response to a selected one of said decoded command signals, and (b) overriding said load shedding operation by restoring said spaced conditioning load within said electrical distribution network prior to expiration of said selected time period in response to one of said temperature signals corresponding to one of said sensed space temperatures that exceeds a maximum space temperature limit or another one of said temperature signals corresponding to another one of said sensed space temperatures that drops below a minimum space temperature limit.

18. The load control apparatus of claim 17, wherein said maximum space temperature limit is greater than a control temperature setpoint of said thermostat.

19. The load control apparatus of claim 17, wherein said minimum space temperature limit is less than a control temperature setpoint of said thermostat.

20. The load control apparatus of claim 17, wherein said minimum space temperature limit and said maximum space temperature limit are preset prior to installation of said load control apparatus at said closed environment by storing said minimum space temperature and said maximum space temperature within a memory storage device.

21. An improved load control apparatus for controlling distribution of electrical energy by an electrical distribution network to a space conditioning load that conducts space conditioning operations within a closed environment, comprising:

a controller, connected to said electrical distribution network, for controlling distribution of said electrical energy to said space conditioning load in response to command signals transmitted by a command center, said command center being remotely located from said load control apparatus;

a thermostat, connected to said controller and to said space conditioning load, for sensing space temperatures within said closed environment and controlling space conditioning operations of said space conditioning load in response to sensing said space temperatures, said controller operative to override control by said thermostat of said space conditioning operations by removing said space conditioning load from said electrical distribution network for a selected time period in response to a selected one of said command signals, said selected time period being a variable time period.

22. The load control apparatus of claim 21, wherein said variable time period is dependent upon the historical duty cycle of said space conditioning load.

23. The load control apparatus of claim 21 wherein said thermostat is further operative to override control by said controller of distribution of said electrical energy to said space conditioning load prior to expiration of said selected time period by outputting a control override signal to said controller in response to sensing one of said space temperatures that exceeds a maximum space temperature limit, said maximum space temperature limit being greater than a control temperature setpoint of said thermostat.

24. The load control apparatus of claim 23, wherein said thermostat is further operative to override control by said controller of distribution of said electrical energy to said space conditioning load prior to expiration of said selected time period by outputting said control override signal to said controller in response to sensing another one of said space temperatures that drops below a minimum space temperature limit, said minimum space temperature limit being less than said control temperature setpoint.

25. The load control apparatus of claim 24, wherein said controller restores distribution of said electrical energy to said space conditioning load by inserting said space conditioning load into said electrical distribution network in response to receiving said control override signal or in response to expiration of said selected time period.

26. In an electrical load management system, said system including transmitting means for transmitting coded command signals for causing electrical load reductions from an electrical distribution network, and a load control apparatus located proximate each of a plurality of space conditioning loads for controlling distribution of electrical energy to said space conditioning loads, each of said space conditioning loads operative to conduct space conditioning operations within a closed environment, the space conditioning operations being controlled by a thermostat in response to the control temperature setpoint of said thermostat, said load control apparatus comprising:

receiving means for producing decoded command signals by decoding said coded command signals, said coded command signals comprising data and command data, said receiving means responsive to said command data only for particular predetermined address data;

switching means, connected to said receiver means and between said space conditioning load and said electrical distribution network, for interrupting distribution of said electrical energy to said space conditioning load by removing said space conditioning load from said electrical distribution network for a selected time period in response to a selected one of said decoded command signals; and temperature sensing means, connected to said switching means, for sensing space temperatures within said closed environment, said temperature sensing means further operative to output a control override signal to cause said switching means to restore distribution of said electrical energy to said space conditioning load by inserting said space conditioning load into said electrical distribution network prior to expiration of said selected time period in response to sensing one of said space temperatures that exceeds a maximum space temperature limit, said maximum space temperature limit being greater than said control temperature setpoint, or another one of said space temperatures that drops below a minimum space temperature limit, said minimum space temperature limit being less than another control temperature setpoint.

27. A method for managing distribution of electrical energy by an electrical distribution network to a space conditioning load that conducts space conditioning operations within a closed environment, the space conditioning operations being controlled by a thermostat in response to the control temperature setpoint of said thermostat, comprising the steps of:

measuring a plurality of space temperatures within said closed environment;

interrupting distribution of said electrical energy to said space conditioning load by removing said space conditioning load from said electrical distribution network for a selected time period in response to a selected one of said command signals, said selected time period having a time interval that is dependent upon the historical duty cycle of said space conditioning load; and overriding said step of interrupting distribution of said electrical energy to said space conditioning load prior to expiration of said selected time period in response to measuring one of said space temperatures that exceeds a maximum space temperature limit, said maximum space temperature limit being greater than said control temperature setpoint.

28. The method of claim 27 further comprising the step of overriding said step of interrupting distribution of said electrical energy to said space conditioning load prior to expiration of said selected time period in response to measuring one of said space temperatures that drops below a minimum space temperature limit, said minimum space temperature limit being less than said control temperature setpoint.

29. The method of claim 28, wherein said step of overriding said step of interrupting distribution of said electrical energy to said space conditioning load comprises generating an override signal that causes the restoration of said electrical energy to said space conditioning load by inserting said space conditioning load into said electrical distribution network.

30. A method for managing the amount of electrical energy distributed by an electrical distribution network to a space conditioning load, comprising the steps of:

measuring a plurality of space temperatures within a closed environment;

controlling the space conditioning operation of said space conditioning load by enabling said space conditioning operation in response to measuring one of said space temperatures that exceeds a control temperature setpoint or disabling said space conditioning operation in response to measuring another one of said space temperatures that drops below said control temperature setpoint;

interrupting distribution of said electrical energy to said space conditioning load by removing said space conditioning load from said electrical distribution network for a selected time period in response to receiving one of a plurality of command signals, said selected time period having a variable time interval; and restoring distribution of said electrical energy to said space conditioning load by inserting said space conditioning load into said electrical distribution network prior to expiration of said selected time period in response to measuring one of said space temperatures that exceeds a maximum space temperature limit, said maximum space temperature limit being greater than said control temperature setpoint.

31. The method of claim 30 further comprising the step of restoring distribution of said electrical energy to said space conditioning load by inserting said space conditioning load into said electrical distribution network prior to expiration of said selected time period in response to measuring one of said space temperatures that drops below a minimum space temperature limit, said minimum space temperature limit being less than said control temperature setpoint.

32. In an electrical load management system, said system including transmitting means for transmitting coded command signals to load control apparatus for causing electrical load reductions in an electrical distribution network, a method for controlling distribution of electrical energy by said electrical distribution network to a space conditioning load controllable by one of said load control apparatus, said space conditioning loads operative to conduct space conditioning operations within a closed environment, said method comprising the steps of:

decoding coded command signals to produce decoded command signals;

interrupting distribution of said electrical energy to said space conditioning load by removing said space conditioning load from said electrical distribution network for a selected time period in response to one of said decoded command signals;

sensing space temperatures within said closed environment; and restoring distribution of said electrical energy to said space conditioning load by inserting said space conditioning load into said electrical distribution network prior to expiration of said selected time period in response to sensing one of said space temperatures that exceeds a maximum space temperature limit stored in a memory storage device of said load control apparatus.

33. The method recited in claim 32, further comprising the step of restoring distribution of said electrical energy to said space conditioning load by inserting said space conditioning load into said electrical distribution network prior to expiration of said selected time period in response to sensing one of said space temperatures that drops below a minimum space temperature limit stored in said memory storage device.

34. In an electrical load management system, said system including transmitting means for transmitting coded command signals to load control apparatus for causing electrical load reductions in an electrical distribution network, a method for controlling distribution of electrical energy by said electrical distribution network to a space conditioning load controllable by one of said load control apparatus, said space conditioning load operative to conduct space conditioning operations within a closed environment the space conditioning operations being controlled by a thermostat in response to the control temperature setpoint of said thermostat, said method comprising the steps of:

decoding coded command signals to produce decoded command signals, said coded command signals comprising data and command data, said load control apparatus responsive to said command data only for particular predetermined address data;

interrupting distribution of said electrical energy to said space conditioning load by removing said space conditioning load from said electrical distribution network for a selected time period in response to a selected one of said decoded command signals;

sensing space temperatures within said closed environment; and restoring distribution of said electrical energy to said space conditioning load by inserting said space conditioning load into said electrical distribution network prior to expiration of said selected time period in response to sensing one of said space temperatures that exceeds a maximum space temperature limit, said maximum space temperature limit being greater than said control temperature setpoint.

35. The method recited in claim 34, further comprising the step of restoring distribution of said electrical energy to said space conditioning load by inserting said space conditioning load into said electrical distribution network prior to expiration of said selected time period in response to sensing one of said space temperatures that drops below a minimum space temperature limit, said minimum space temperature limit being less than said control temperature setpoint.

36. A method for controlling distribution of electrical energy by an electrical distribution network to a space conditioning load, said space conditioning load operative to conduct space conditioning operations within a closed environment, the space conditioning operations being controlled by a thermostat in response to the control temperature setpoint of said thermostat, said method comprising the steps:

generating temperature signals in response to sensing space temperatures within a closed environment;

producing decoded command signals in response to receiving command signals transmitted by a command center;

implementing a load shedding operation by removing said space conditioning load from said electrical distribution network for a selected time period in response to a selected one of said decoded command signals, and;

overriding said load shedding operation by restoring said spaced conditioning load within said electrical distribution network prior to expiration of said certain time period in response to one of said temperature signals corresponding to one of said sensed space temperatures that exceeds a maximum space temperature limit or another one of said temperature signals corresponding to another one of said sensed space temperatures that drops below a minimum space temperature limit.

37. For use in an electrical load management system, said system including transmitting means for transmitting coded command signals to load control apparatus for causing electrical load reductions from an electrical distribution network, a method for controlling distribution of electrical energy by said electrical distribution network to a space conditioning load controllable by one of said load control apparatus, said space conditioning load controlled by a thermostat and operative to conduct space conditioning operations in response to the control temperature setpoint of said thermostat, said method comprising the steps of:

generating temperature signals in response to sensing space temperatures within a closed environment, each of said temperature signals corresponding to a sensed space temperature;

producing decoded command signals in response to receiving said command signals;

interrupting distribution of said electrical energy to said space conditioning load by removing said space conditioning load from said electrical distribution network for a certain time period in response to a selected one of said decoded command signals; and restoring distribution of said electrical energy to said space conditioning load by inserting said space conditioning load within said electrical distribution network prior to expiration of said certain time period in response to one of said temperature signals corresponding to one of said sensed space temperatures that exceeds a maximum space temperature limit or another one of said temperature signals corresponding to another one of said sensed space temperatures that drops below a minimum space temperature limit.

38. The method recited by claim 37, wherein said minimum space temperature limit and said maximum space temperature limit are maintained in memory storage means of said load control apparatus associated with said space conditioning load.

39. In an electrical load management system, said system including transmitting means for transmitting coded command signals for causing electrical load reductions from an electrical distribution network, and a load control apparatus located proximate each of a plurality of space conditioning loads to be controlled within said electrical distribution network, said space conditioning load controlled by a thermostat and operative to conduct space conditioning operations in response to the control temperature setpoint of said thermostat, said load control apparatus comprising:

temperature sensing means for generating temperature signals in response to sensing space temperatures within a closed environment, each of said temperature signals corresponding to a sensed space temperature;

receiving means for producing decoded command signals in response to receiving said command signals; and switching means, connected to said receiving means and said temperature sensing means, for
(a) interrupting distribution of said electrical energy to said space conditioning load by removing said space conditioning load from said electrical distribution network for a certain time period in response to a selected one of said decoded command signals, and
(b) restoring distribution of said electrical energy to said space conditioning load by inserting said space conditioning load within said electrical distribution network prior to expiration of said certain time period in response to one of said temperature signals corresponding to one of said sensed space temperatures that exceeds a maximum space temperature limit or another one of said temperature signals corresponding to another one of said sensed space temperatures that drops below a minimum space temperature limit.

40. The load control apparatus of claim 39, wherein said maximum space temperature limit exceeds the control temperature setpoint and said minimum space temperature limit drops below another control temperature setpoint.

41. The load control apparatus of claim 39 further comprising memory storage means connected to said switching means for storing said minimum space temperature limit and said maximum space temperature limit.

42. The load control apparatus of claim 41, wherein predetermined values of said minimum space temperature limit and said maximum space temperature limit are communicated to said load control apparatus by said transmitting means transmitting a certain one of said coded command signals.

43. The load control apparatus of claim 42, wherein said memory storage means stores said minimum space temperature limit and said maximum space temperature limit in response to said receiving means decoding said certain one of said coded command signals.

44. The load control apparatus of claim 39, wherein predetermined values of said minimum space temperature limit and said maximum space temperature limit are set prior to installation of said load control apparatus at said closed environment by storing said minimum space temperature limit and said maximum space temperature limit within said memory storage means.

45. The load control apparatus of claim 44, wherein said coded command signals comprise address data and command data, wherein each of said load control apparatus is responsive to command data only for particular predetermined address data.

46. The load control apparatus of claim 45, wherein said transmitting means transmits said coded command signals to said load control apparatus via a power line carrier.

47. The load control apparatus of claim 45, wherein said transmitting means transmits said coded command signals to said load control apparatus via a radio frequency transmitter.

48. The apparatus of claim 39, wherein said space conditioning load is an air conditioning system.

49. The apparatus of claim 39, wherein said space conditioning load is forced air heating system.

\* \* \* \* \*